(12) United States Patent
Kim et al.

(10) Patent No.: US 9,288,812 B2
(45) Date of Patent: Mar. 15, 2016

(54) METHOD FOR AVOIDING INTER-CELL INTERFERENCE IN A WIRELESS ACCESS SYSTEM

(75) Inventors: Hakseong Kim, Anyang (KR); Yoan Shin, Seoul (KR); Sungcheol Yoo, Incheon (KR); Ohsoon Shin, Seoul (KR); Kijun Kim, Anyang (KR); Mochan Yang, Seoul (KR)

(73) Assignees: LG Electronics Inc., Seoul (KR); Sungkyunkwan University Foundation For Corporate, Suwon-Si (KR)

( * ) Notice: Subject to any disclaimer, the term of this patent is extended or adjusted under 35 U.S.C. 154(b) by 266 days.

(21) Appl. No.: 13/984,780

(22) PCT Filed: Oct. 6, 2011

(86) PCT No.: PCT/KR2011/007421
§ 371 (c)(1),
(2), (4) Date: Aug. 9, 2013

(87) PCT Pub. No.: WO2012/108605
PCT Pub. Date: Aug. 16, 2012

(65) Prior Publication Data
US 2013/0315193 A1    Nov. 28, 2013

Related U.S. Application Data

(60) Provisional application No. 61/440,874, filed on Feb. 9, 2011, provisional application No. 61/443,727, filed on Feb. 17, 2011, provisional application No. 61/472,199, filed on Apr. 6, 2011.

(51) Int. Cl.
| | | |
|---|---|---|
| H04W 72/08 | (2009.01) | |
| H04L 5/00 | (2006.01) | |
| H04L 1/18 | (2006.01) | |
| H04L 1/00 | (2006.01) | |
| H04W 72/04 | (2009.01) | |
| H04W 88/08 | (2009.01) | |
| H04B 7/155 | (2006.01) | |

(52) U.S. Cl.
CPC .......... *H04W 72/082* (2013.01); *H04L 1/1858* (2013.01); *H04L 5/001* (2013.01); *H04B 7/15542* (2013.01); *H04L 1/1854* (2013.01); *H04L 1/1861* (2013.01);
(Continued)

(58) Field of Classification Search
USPC .......................................... 370/329, 450–455
See application file for complete search history.

(56) References Cited

U.S. PATENT DOCUMENTS

2009/0264077 A1    10/2009  Damnjanovic
2010/0272009 A1    10/2010  Cheng et al.
(Continued)

FOREIGN PATENT DOCUMENTS

| KR | WO 2010107207 A2 * | 9/2010 | ........... H04B 7/2606 |
| WO | WO 2010107207 A2 * | 9/2010 | |

*Primary Examiner* — Charles C Jiang
*Assistant Examiner* — Kyaw Z Soe
(74) *Attorney, Agent, or Firm* — Birch, Stewart, Kolasch & Birch, LLP

(57) ABSTRACT

A method for a relay node (RN) to avoid inter-cell interference (ICI) in a wireless access system is provided. The method includes: overhearing a PDCCH transmitted by a plurality of BSs sharing the RN to terminals of each BS in the nth subframe; decoding the PDCCH from the n+1th subframe to the n+2th subframe; reallocating resource area to the terminals; transmitting control information representing the reallocated resource area to each BS; overhearing and decoding a PUSCH to each BS in the n+4th subframe; transmitting the decoding result to each BS; overhearing a PDCCH updated at n+8th subframe; and retransmitting the PUSCH transmitted at the n+4th subframe to a BS(NACK) in the n+12th sub frame.

14 Claims, 30 Drawing Sheets

(52) U.S. Cl.
CPC ... *H04L 2001/0092* (2013.01); *H04W 72/0426* (2013.01); *H04W 88/085* (2013.01)

(56) References Cited

U.S. PATENT DOCUMENTS

| | | | | |
|---|---|---|---|---|
| 2011/0044259 A1* | 2/2011 | Nimbalker | ............. | H04L 5/001 370/329 |
| 2011/0141901 A1* | 6/2011 | Luo | ....................... | H04L 1/1822 370/241 |
| 2011/0143804 A1* | 6/2011 | Blomgren | ............. | H04W 52/12 455/522 |
| 2011/0280174 A1* | 11/2011 | Li | ....................... | H04B 7/15528 370/315 |
| 2012/0002598 A1* | 1/2012 | Seo | ....................... | H04B 7/2606 370/315 |
| 2012/0039284 A1* | 2/2012 | Barbieri | ................ | H04W 48/10 370/329 |
| 2012/0156984 A1* | 6/2012 | Gan | ................... | H04B 7/15542 455/7 |
| 2012/0263067 A1* | 10/2012 | Kim | ................... | H04W 72/082 370/252 |
| 2013/0064197 A1* | 3/2013 | Novak | ............... | H04W 72/085 370/329 |

* cited by examiner

☐ :RBs allocated to UE outside SRN (910)
▨ :RBs allocated to UE inside SRN (920)
▦ :Collision RB (930)

☐ :RBs allocated to UE outside SRN (910)
▨ :RBs allocated to UE inside SRN (920)
▦ :Collision RB (930)

☐ :RBs allocated to UE outside SRN (910)
▨ :RBs allocated to UE inside SRN (920)
▦ :Collision RB (930)

METHOD FOR AVOIDING INTER-CELL INTERFERENCE IN A WIRELESS ACCESS SYSTEM

CROSS REFERENCE TO RELATED APPLICATIONS

This non-provisional application is a National Stage entry under U.S.C. §371 of International Application No. PCT/KR2011/007421 filed on Oct. 6, 2011, which claims the benefit of U.S. Provisional Application Nos. 61/440,874 filed on Feb. 9, 2011, 61/443,727 filed on Feb. 17, 2011 and 61/472,199 filed on Apr. 6, 2011. The entire contents of all of the above applications are hereby incorporated by reference.

TECHNICAL FIELD

This specification relates to a wireless access system and, more particularly, to a method of avoiding Inter-Cell Interference (ICI) in uplink.

BACKGROUND ART

A $3^{rd}$ Generation Partnership Project Long Term Evolution (3GPP LTE)-Advanced as the next-generation mobile communication system standard supports multi-hop relay transmission technology in which cell coverage is extended by installing Relay Nodes (RNs) in a shadow area and a cell boundary area and high transfer rate can be provided to users.

Furthermore, Orthogonal Frequency Division Multiple Access (OFDMA) technology is a modulation and decoding scheme for overcoming a multi-path fading phenomenon in a radio channel and is advantageous in that time, frequency, and power resources can be flexibly allocated to a plurality of users using a plurality of subcarriers.

Resource Allocation (RA) using an OFDMA scheme has high efficiency because each resource does not have a limit due to external interference by taking only a single cell into consideration. In actual multiple cells, however, great interference is generated between neighboring cells when the cells use the same frequency resources.

In order to overcome this problem, there was proposed a method of changing a frequency reuse pattern in a cell and a cell boundary area. The method, however, is problematic in that efficiency is low in terms of frequency use because each cell is divided into several areas and frequencies are statically allocated to the areas.

DISCLOSURE

Technical Problem

An object of this specification is to provide a method of reallocating resources that collide against each other within the coverage of an RN in order to implement a fully dynamic RA method in each cell and also avoid Inter-Cell Interference (ICI). Furthermore, an object of this specification is to effectively perform an HARQ process in uplink through the method.

Technical Solution

In order to achieve the above object, in accordance with one disclosure of this specification, there is provided an operating method of a Relay Node (RN) for avoiding Inter-Cell Interference (ICI) in a wireless access system. The method may include the steps of overhearing Physical Downlink Control Channel (PDCCH)s transmitted from a plurality of eNBs, sharing the RN, to UEs within the coverage of each eNB, in an $n^{th}$ subframe, wherein the PDCCH comprises an uplink (UL) grant; decoding the PDCCHs in an $(n+1)^{th}$ subframe to an $(n+2)^{th}$ subframe; reallocating resource regions allocated to the UEs in the PDCCHs if, as a result of the decoding, a collision has occurred between the resource regions; sending control information indicative of the reallocated resource region to each of the eNBs; overhearing PUSCHs transmitted from the UEs to the eNBs in an $(n+4)^{th}$ subframe; decoding the PUSCHs; sending a result of the decoding to each of the eNBs; overhearing updated PDCCHs by taking a response to the PUSCHs transmitted by the eNBs and the reallocated resource regions in an $(n+8)^{th}$ subframe into consideration, wherein the response is ACK or NACK; and retransmitting the PUSCH, transmitted in the $(n+4)^{th}$ subframe, to an eNB that has sent NACK based on the updated PDCCH in an $(n+12)^{th}$ subframe.

The step of sending the control information to each of the eNBs may include the steps of comparing the resource regions, allocated to the UEs within the coverage of the RN through a downlink signal, with each other and checking whether or not a resource region in which a collision is generated is present and performing a resource reallocation process on the resource region in which the collision is generated if, as a result of the check, a resource region in which a collision is generated is present.

The step of performing the resource reallocation process may include the step of exchanging the resource region in which the collision is generated with resource regions allocated to UEs outside the coverage of the RN.

The step of exchanging the resource regions may include the steps of comparing a Signal-to-Interference plus Noise Ratio (SINR) value of the resource region in which the collision is generated with an SINR value of each of the resource regions allocated to the UEs outside the coverage of the RN and determining a resource region, having the smallest SINR value difference as a result of the comparison, as the resource region to be exchanged.

The plurality of eNBs may include 3 eNBs, and the RN may be a Shared Relay Node (SRN) shared by the eNBs.

The method may further include the step of sending the success or failure of the decoding to each of the eNBs after the step of decoding the PUSCHs.

The method may further include the step of sending whether or not the step of overhearing the updated PDCCH has been successfully performed to each of the eNBs, after the step of overhearing the updated PDCCH by taking the response to the PUSCHs transmitted by the eNBs and the reallocated resource regions in the $(n+8)^{th}$ subframe into consideration.

The RN may use X2 signaling with the plurality of eNBs.

The response to the PUSCHs transmitted by the eNBs in the $(n+8)^{th}$ subframe may be NACK when the RN operates in a cooperative mode and may be ACK when the RN operates in a non-cooperative mode.

In order to achieve the above object, in accordance with another disclosure of this specification, there is provided an operating method of an eNB for avoiding Inter-Cell Interference (ICI) in a wireless access system. The method may include the steps of sending a PDCCH to UE within the coverage of the eNB in an $n^{th}$ subframe, wherein the PDCCH may include an UL grant; receiving control information, indicating that a resource reallocation process for the PDCCH is necessary, from a Relay Node (RN) in an $(n+3)^{th}$ subframe; receiving a PUSCH from the UE in an $(n+4)^{th}$ subframe; decoding the received PUSCH; reallocating a resource region allocated to the UE in the PDCCH based on the control information received from the RN; sending an updated PDCCH to the UE in an (n+8)$^{th}$ subframe by taking a response to a result of the decoding of the PUSCH and the resource region reallocation into consideration, wherein the response is ACK or NACK; and receiving the PUSCH transmitted in the (n+4)$^{th}$ subframe again in response to the updated PDCCH in an (n+12)$^{th}$ subframe if NACK has been transmitted.

The step of reallocating the resource region allocated in the n$^{th}$ subframe may include the steps of comparing resource regions, allocated to UEs within the coverage of the RN through a downlink signal, with each other and checking whether or not a resource region in which a collision is generated is present and performing a resource reallocation process on the resource region in which the collision is generated if, as a result of the check, a resource region in which a collision is generated is present.

The step of performing the resource reallocation process may include the step of exchanging the resource region in which the collision is generated with resource regions allocated to UEs outside the coverage of the RN.

The step of exchanging the resource regions may include the steps of comparing a Signal-to-Interference plus Noise Ratio (SINR) value of the resource region in which the collision is generated with an SINR value of each of the resource regions allocated to the UEs outside the coverage of the RN and determining a resource region, having the smallest SINR value difference as a result of the comparison, as the resource region to be exchanged.

The RN may be a Shared Relay Node (SRN) shared by a plurality of eNBs.

The method may further include the step of receiving whether or not the decoding of the PUSCH is successful from the RN, after decoding the received PUSCH.

The method may further include the step of receiving whether or not the response from the RN and the updated PDCCH have been successfully overheard, after sending the updated PDCCH to the UE by taking the response to a result of the decoding of the PUSCH and the resource region reallocation in the (n+8)$^{th}$ subframe into consideration.

Advantageous Effects

This specification is advantageous in that Inter-Cell Interference (ICI) in uplink can be avoided by reallocating resources to collided resource regions if resource regions allocated to terminals within an SRN collide against each other when the SRN overhears an uplink or downlink signal between an eNB and the terminals.

MODE FOR INVENTION

Figure 1:
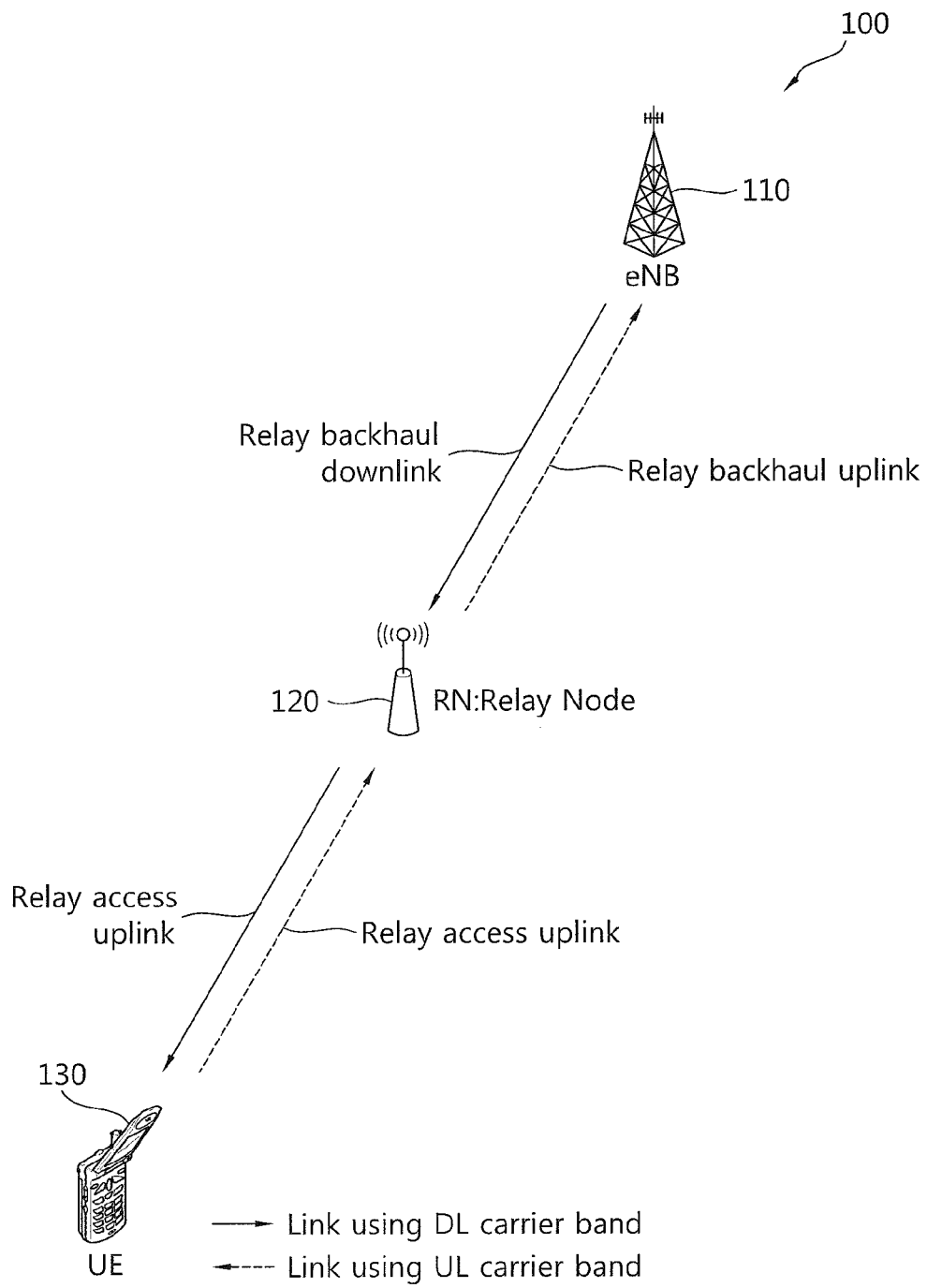
FIG. 1 is a diagram showing the configuration of a relay backhaul link and a relay access link in a wireless communication system 100 to which an embodiment of this specification can be applied.

Hereinafter, preferred embodiments of the present invention are described in detail with reference to the accompanying drawings. The detailed description to be disclosed below along with the accompanying drawings is intended to describe an exemplary embodiment of the present invention, but is not intended to describe a single embodiment that may be implemented by the present invention.

The following detailed description includes details in order to provide the full understanding of the present invention. However, those skilled in the art will appreciate that the present invention can be implemented without the details. For example, the following detailed description is given assuming that a mobile communication system is a 3GPP LTE system, but can also be applied to other specific mobile communication systems except matters unique to 3GPP LTE.

In some cases, a known structure and apparatus may be omitted in order to avoid making vague the concept of the present invention or may be shown in the form of a block diagram on the basis of core functions of each structure and apparatus. Furthermore, in the entire specification, the same reference numerals are used to denote the same elements.

Moreover, in the following description, it is assumed that a terminal commonly refers to a mobile or fixed type device in a user terminal, such as User Equipment (UE), a Mobile Station (MS), and an advanced mobile station. It is also assumed that a base station commonly refers to a specific node in a network terminal which communicates with terminals, such as a Node B, an eNode B, and an Access Point (AP). A relay can be called in various ways, for example, a Relay Node (RN) or a Relay Station (RS).

In a mobile communication system, UE and a relay can receive information from an eNB through downlink, and the UE and the relay can send information through uplink. The information transmitted or received by the UE and the relay can include data and various pieces of control information, and a variety of physical channels are present depending on the type and use of information transmitted or received by the UE and the relay.

FIG. 1 is a diagram showing the configuration of a relay backhaul link and a relay access link in a wireless communication system 100 to which an embodiment of this specification can be applied.

In a $3^{rd}$ Generation Partnership Project Long Term Evolution-Advanced (3GPP LTE-A) system, a role for forwarding a link connection between an eNB 110 and UE 130 is introduced into an RN 120, and two types of links having different attributes are applied to respective UL and DL carrier frequency bands. A connection link part configured between the links of an eNB and an RN is defined as a backhaul link. Transmission using downlink resources according to a Frequency Division Duplex (FDD) or Time Division Duplex (TDD) method can be called backhaul downlink, transmission using uplink resources according to an FDD or TDD method can be called backhaul uplink.

In contrast, a connection link part configured between an RN and UEs is defined as an RN access link. If transmission using a downlink frequency band (in the case of FDD) or downlink subframe (in the case of TDD) resources is performed in the RN access link, this can be called access downlink. If transmission using an uplink frequency band (in the case of FDD) or uplink subframe (in the case of TDD) resources is performed in the RN access link, this can be called access uplink.

The RN can receive information from the eNB through RN backhaul downlink and can send information to the eNB through RN backhaul uplink. Furthermore, the RN can receive information to the UE through RN access downlink and can receive information from the UE through RN access uplink.

The RN can perform an initial cell search task, such as synchronization with the eNB. To this end, the RN can receive a synchronization channel from the eNB, perform synchronization with the eNB, and obtain information, such as a cell ID. Thereafter, the RN can receive a physical broadcast channel from the eNB and obtain broadcast information within a cell. Meanwhile, the RN can receive an RN backhaul downlink reference signal in the initial cell search step and check a channel state of RN backhaul downlink. The RN can receive a Relay-Physical Downlink Control Channel (R-PDCCH) and/or a Relay-Physical Downlink Shared Channel (R-PDSCH) in order to obtain more detailed system information.

Meanwhile, if the RN accesses the eNB for the first time or does not have radio resources for signal transmission, the RN can perform a random access process on the eNB. To this end, the RN can send a preamble through a Physical Random Access Channel (PRACH) and receive a response message for the random access through an R-PDCCH and an R-PDSCH corresponding to the R-PDCCH.

In the case of contention-based random access except the case of handover, a contention resolution procedure, such as the transmission of an additional PRACH and the reception of additional R-PDCCH/R-PDSCH, can be performed.

After performing the above-described procedure, the RN can perform the transmission of an R-PDCCH/R-PDSCH and an Relay-Physical Uplink Shared CHannel (R-PUSCH)/Relay-Physical Uplink Control Channel (R-PUCCH) as a common uplink/downlink signal transmission procedure.

Here, control information transmitted from the RN to the eNB through uplink or received by the eNB from the RN can include an ACK/NACK signal, a Channel Quality Indicator (CQI), a Precoding Matrix Index (PMI), a Rank Indicator (RI), etc. In the case of a $3^{rd}$ Generation Partnership Project Long Term Evolution (3GPP LTE)-A system, the RN can send control information, such as a CQI, a PMI, and an RI, through an R-PUSCH/R-PUCCH.

Figure 2:
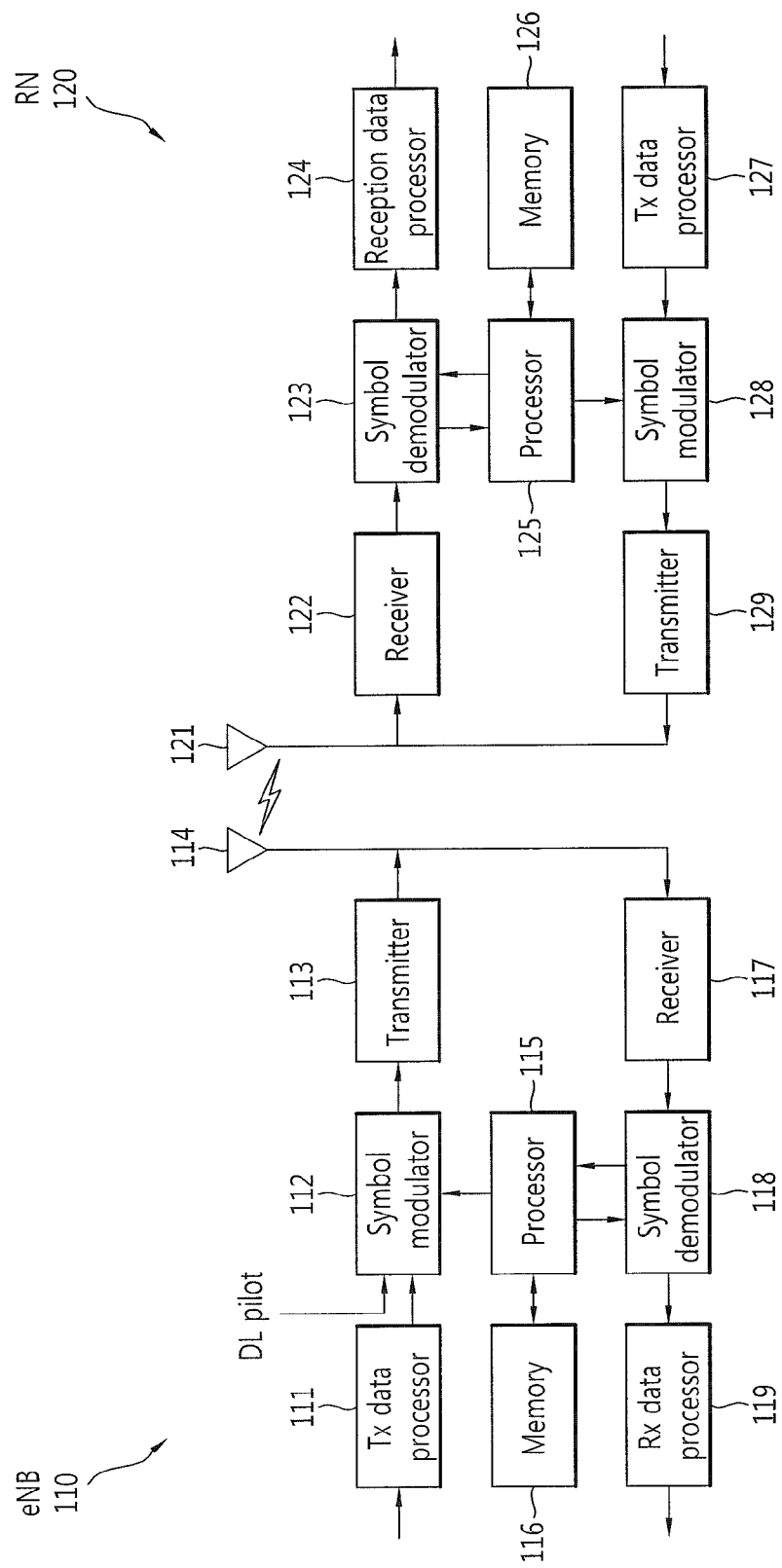
FIG. 2 is an internal block diagram of an eNB 110 and a relay 120 in the wireless communication system 100 to which an embodiment of this specification can be applied.

FIG. 2 is an internal block diagram of the eNB 110 and the RN 120 in the wireless communication system 100 to which an embodiment of this specification can be applied.

Although one eNB 110 and one RN 120 are illustrated in order to simply show the wireless communication system 100, the wireless communication system 100 can include one or more eNBs and/or one or more RNs.

Referring to FIG. 2, the eNB 110 can include a Tx data processor 111, a symbol modulator 112, a transmitter 113, a Tx/Rx antenna 114, a processor 115, a memory 116, a receiver 117, a symbol demodulator 118, and an Rx data processor 119.

Here, the transmitter 113 and the receiver 117 may be represented by an RF communication unit.

Furthermore, the RN 120 may include a Tx data processor 127, a symbol modulator 128, a transmitter 129, a Tx/Rx antenna 121, a processor 125, a memory 126, a receiver 122, a symbol demodulator 123, and an Rx data processor 124. Although the antennas 114 and 121 are illustrated in the eNB 110 and the RN 120, respectively, as one, each of the eNB 110 and the RN 120 includes a plurality of antenna. Likewise, the transmitter 129 and the receiver 122 may be represented by an RF communication unit.

Accordingly, the eNB 110 and the RN 120 according to the present invention support a Multiple Input Multiple Output (MIMO) system. The eNB 110 according to the present invention can support both a Single User-MIMO (SU-MIMO) method and a Multi User-MIMO (MU-MIMO) method.

In downlink, the Tx data processor 111 receives traffic data, formats and codes the received traffic data, interleaves and modulates (or performs symbol mapping on) the coded traffic data, and provides modulation symbols ("data symbols"). The symbol modulator 112 receives the data symbols and pilot symbols, processes the received data symbols and pilot symbols, and provides the stream of the symbols.

The symbol modulator 112 multiplexes data and the pilot symbols and sends the multiplexed data and pilot symbols to the transmitter 113. Here, each of the transmission symbols may be a data symbol, a pilot symbol, or a null signal value. In each symbol interval, pilot symbols may be continuously transmitted. The pilot symbols may be an FDM, Orthogonal Frequency Division Multiplexing (OFDM), Time Division Multiplexing (TDM), or Code Division Multiplexing (CDM) symbol.

The transmitter 113 receives the stream of the symbols, converts the stream of the symbols into one or more analog signals, and generates a downlink signal suitable for transmission through a radio channel by additionally controlling the analog signals (e.g., amplification, filtering, and frequency-up conversion). Next, the downlink signal is transmitted to the RN through the antenna 114.

In the construction of the RN 120, the antenna 121 receives the downlink signal from the eNB and provides the received signal to the receiver 122. The receiver 122 controls (e.g., filtering, amplification, and frequency down-conversion) the received signal and obtains the samples by digitalizing the controlled signal. The symbol demodulator 123 decodes the received pilot symbols and provides the decoded symbols to the processor 125 in order to estimate a channel.

Furthermore, the symbol demodulator 123 receives a frequency response estimation value for downlink from the processor 125, obtains data symbol estimation values (i.e., estimation values of the transmitted data symbols) by performing data decoding on the received data symbols, and provides the data symbol estimation values to the RX data processor 124. The Rx data processor 124 decodes (i.e., performs symbol de-mapping on) the data symbol estimation values and recovers the transmitted traffic data by de-interleaving and decoding the decoded data symbol estimation values.

The processing by the symbol demodulator 123 and the Rx data processor 124 is complementary to the processing by the symbol modulator 112 and the Tx data processor 111 in each eNB 110.

In uplink, the Tx data processor 127 of the RN 120 processes traffic data and provides the data symbols. The symbol modulator 128 can receive the data symbols, multiplex and modulate the received data symbols, and provide the stream of the symbols to the transmitter 129. The transmitter 129 receives the stream of the symbols, generates an uplink signal by processing the stream of the symbols, and sends the uplink signal to the eNB 110 through the antenna 121.

In the eNB 110, the uplink signal is received from the RN 120 through the antenna 114, and the receiver 117 obtains samples by processing the received uplink signal. Next, the symbol demodulator 118 processes the samples and provides pilot symbols and a data symbol estimation value received for uplink. The Rx data processor 119 recovers traffic data transmitted by the RN 120 by processing the data symbol estimation value.

The processors 115 and 125 of the RN 120 and the eNB 110 instruct (e.g., control, adjust, and manage) operations in the RN 120 and the eNB 110, respectively. The processors 115 and 125 can be coupled with the respective memory units 116 and 126 for storing program codes and data. The memory units 116 and 126 are coupled with the respective processors 115 and 125, and they store an operating system, applications, and general files.

Each of the processors 115 and 125 may also be called a controller, a microcontroller, a microprocessor, or a microcomputer. Meanwhile, the processors 115 and 125 may be implemented by hardware, firmware, software, or a combination of them. If an embodiment of the present invention is implemented using hardware, Application-Specific Integrated Circuits (ASICs) or Digital Signal Processors (DSPs), Digital Signal Processing Devices (DSPDs), Programmable Logic Devices (PLDs), Field Programmable Gate Arrays (FPGAs), etc. which are configured to perform the present invention can be included in the processors 115 and 125.

Meanwhile, if embodiments of the present invention are implemented using firmware or software, the firmware or software can be configured to include modules, procedures, or functions for performing the functions or operations of the present invention. The firmware or software configured to perform the present invention can be included in the processors 115 and 125 or stored in the memory units 116 and 126 and can be driven by the processors 115 and 125.

The layers of a radio interface protocol between the wireless communication systems (networks) of the RN and the eNB can be classified into a first layer L1, a second layer L2, and a third layer L3 based on the 3 lower layers of an Open System Interconnection (OSI) model that is well known in communication systems. A physical layer belongs to the first layer and provides information transmission service through a physical channel. A Radio Resource Control (RRC) layer belongs to the third layer and provides control radio resources between UE and a network. The RN and the eNB can exchange RRC messages through a radio communication network and the RRC layer.

Figure 3:
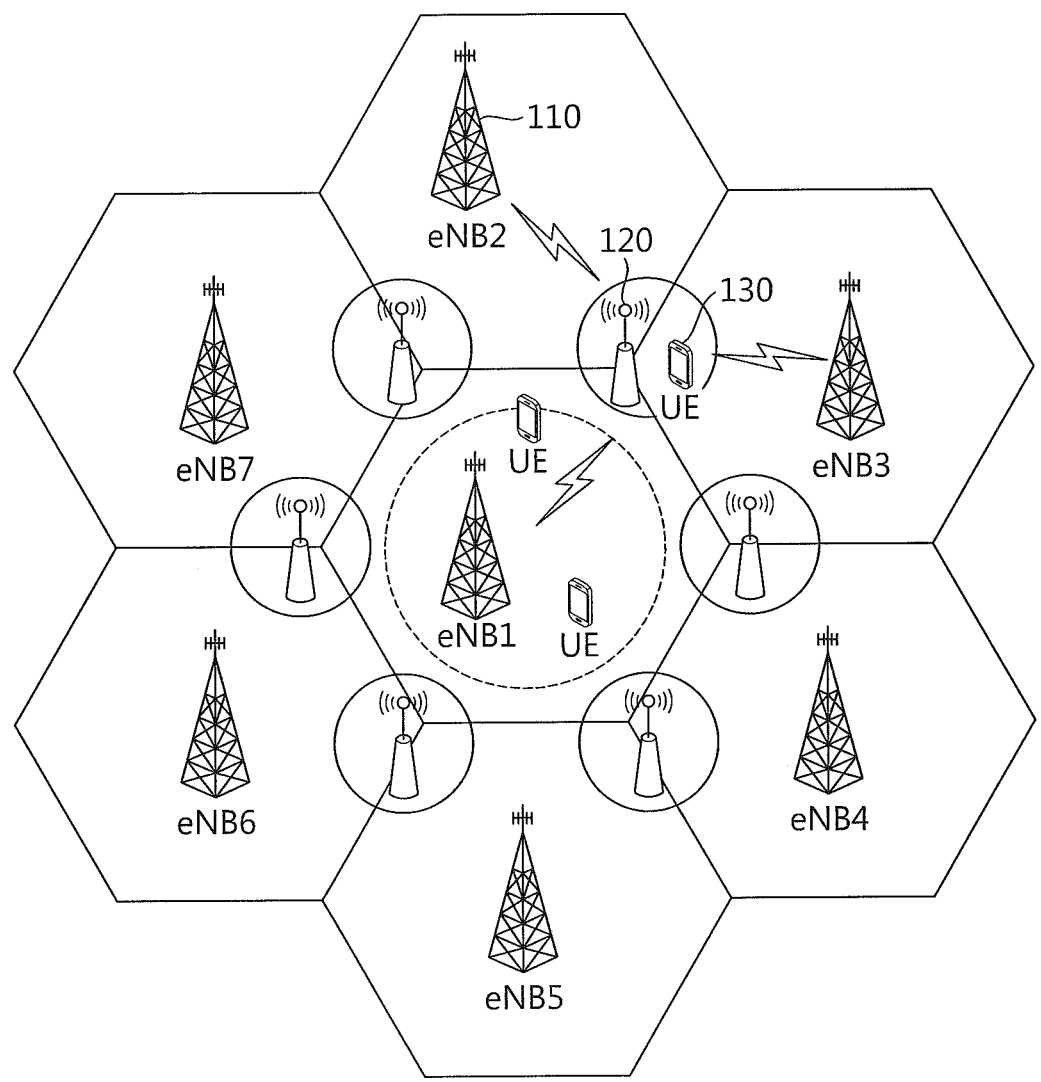
FIG. 3 is a diagram showing the structure of a multi-cell shared relay to which an embodiment of this specification can be applied.

FIG. 3 is a diagram showing the structure of a multi-cell shared relay to which an embodiment of this specification can be applied.

A method of avoiding Inter-Cell Interference (ICI) based on a Shared Relay Node (SRN) that is provided by this specification, as shown in FIG. 3, has a network basic structure based on an SRN in which three enhanced Node-Bs (eNBs) 110 share one SRN 120. Furthermore, it is assumed that the three eNBs sharing the SRN is Full Frequency Reuse (FFR).

Referring to FIG. 3, the SRN is placed at the center of the 3 independent cells, and the SRN performs data retransmission for improving the throughput of a cell boundary area, that is, a basic function of a relay. Furthermore, the SRN functions to perform control so that interference between MSs causing a reduction of performance in a cell boundary area can be avoided, while overhearing a downlink signal from each eNB and an uplink signal from UE 130. A detailed method is described later.

Here, the SRN is similar to a Type II RN in terms of its function, but supports some additional functions as compared with the Type II RN in terms of the sharing of a control signal. That is, the SRN described in this specification has characteristics, such as those of 1 to 12.

1. The SRN does not have an additional cell ID and does not generate another new cell.

2. The SRN can send a PDSCH (can perform a function of relaying Rel-8 UEs.).

3. Rel-8 UEs cannot recognize the presence of the SRN.

4. The SRN can send control (a PDCCH, a PUCCH, etc.) information to eNBs through X2 signaling, but cannot send the control information to UEs. (However, the SRN can send a PDCCH signal without interference in the case of a non-cooperative mode.)

5. The SRN can restore control (a PDCCH, a PUCCH, etc.) information.

6. The SRN newly defines X2 signaling for sharing control information with eNBs.

7. The SRN performs a relay function on only UEs which overhear downlink and uplink signals between eNBs and the UEs.

8. The SRN has a function of determining UE placed in its area in order to coordinate ICI.

: the SRN has a function of determining UE within the area of the SRN based on a specific threshold by overhearing the uplink Sounding Reference Signal (SRS) of UEs.

9. The SRN can perform channel measurement on an uplink SRS signal and change an MCS Level by overhearing the uplink SRS signal.

10. The SRN shares PDCCH and PDSCH information by overhearing downlink signals from a plurality of eNBs to UEs.

11. The SRN shares PUCCH and PUSCH information by overhearing UEs→eNBs uplink signals in its area.

12. The SRN performs the management of interference between cells using information shared by methods, such as those of 10 and 11. Here, the management of interference between cells mean all possible methods using data obtained by 10 and 11.

That is, this specification provides a method in which an SRN not an eNBs becomes the center of a cluster, shares pieces of information of eNBs, determines UEs having ICI at a cell boundary, and directly reallocates resources for ICI avoidance based on the functions of the SRN.

Figure 4A:
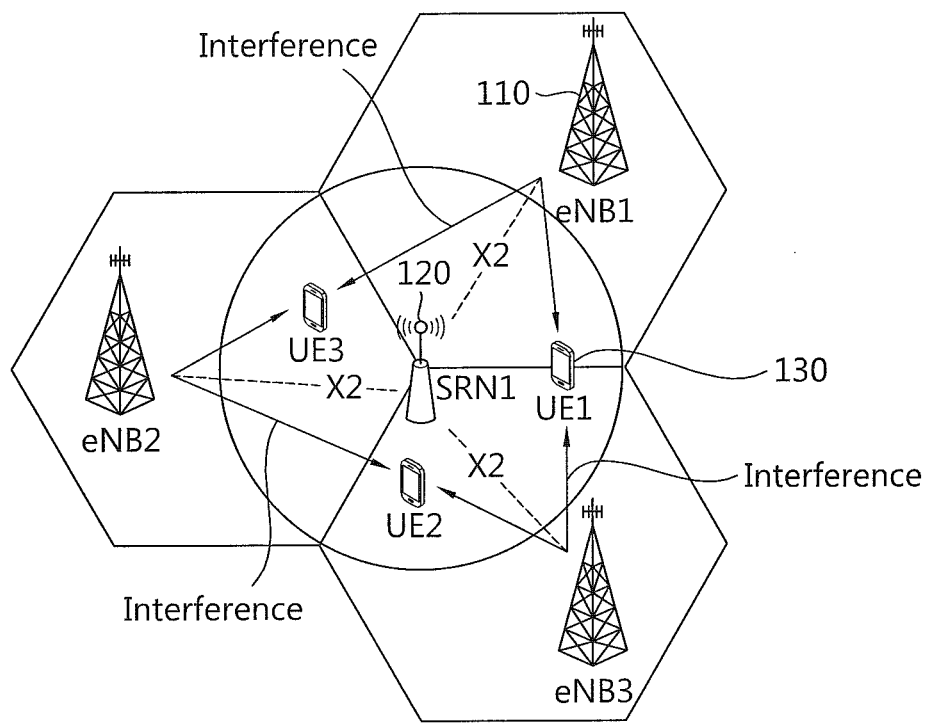
FIGS. 4(a) to 4(c) are diagrams showing a case where ICI is generated in a network structure based on an SRN.
Figure 4B:
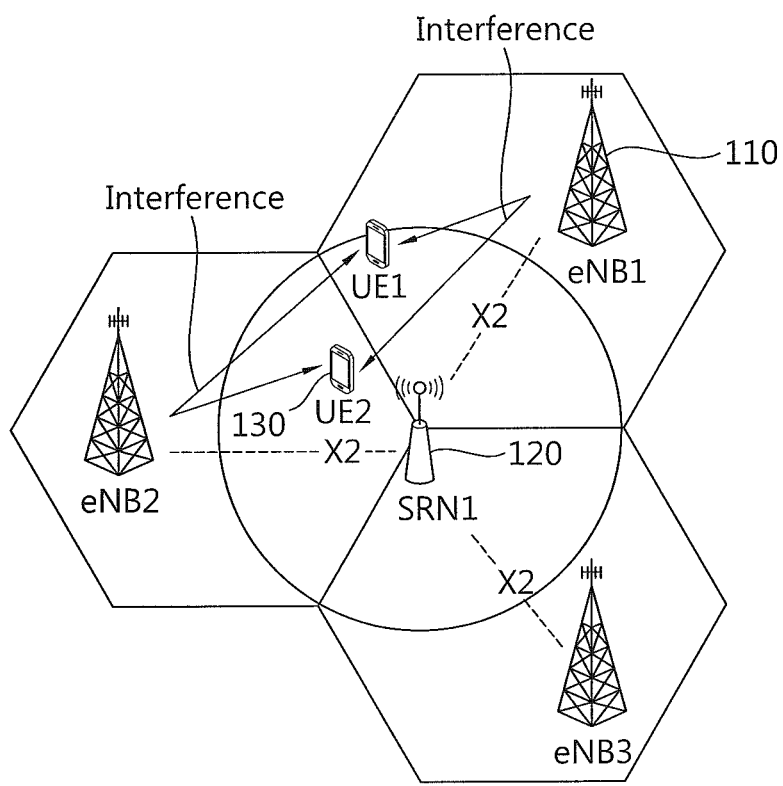
Figure 4C:
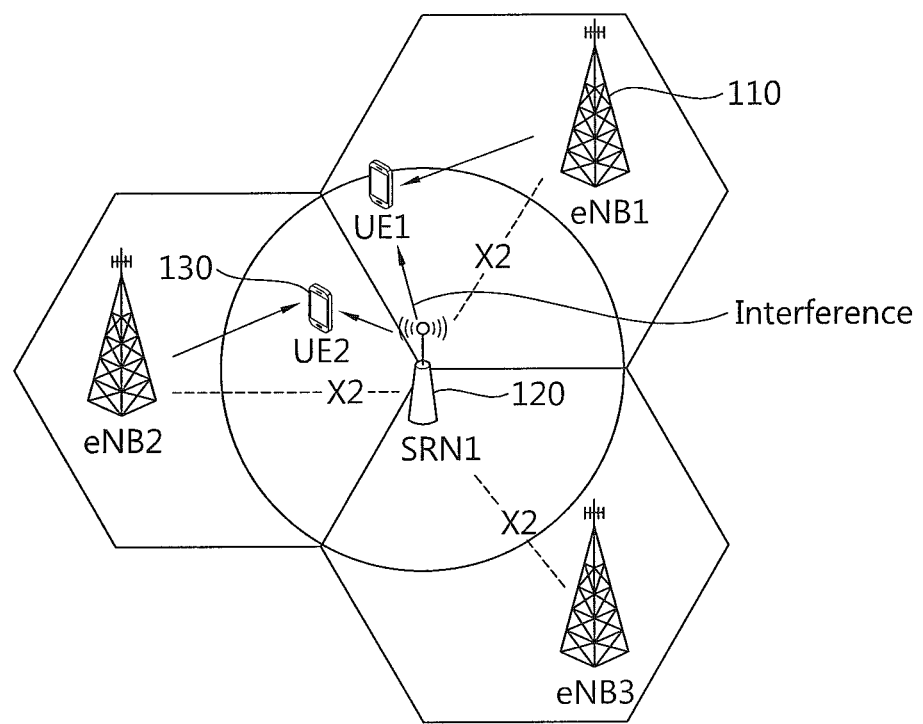

FIGS. 4(a) to 4(c) are diagrams showing a case where ICI is generated in a network structure based on an SRN.

FIG. 4a shows a case where ICI is generated because the same resources are used in direct links (i.e., eNB1-UE1, eNB2-UE2, and eNB3-UE3) between the 3 eNBs 110 and the UEs 130.

FIG. 4b shows a case where ICI is generated because the same resources are used in direct links (i.e., eNB1-UE1 and eNB2-UE2) between the two eNBs and the UEs.

FIG. 4c shows a case where ICI is generated because a signal from the access link of an SRN becomes an interference source for UE1 when an eNB1-UE1 direct link and an SRN-UE2 access link use the same resources in a process of the SRN 120 retransmitting a signal.

Figure 5:
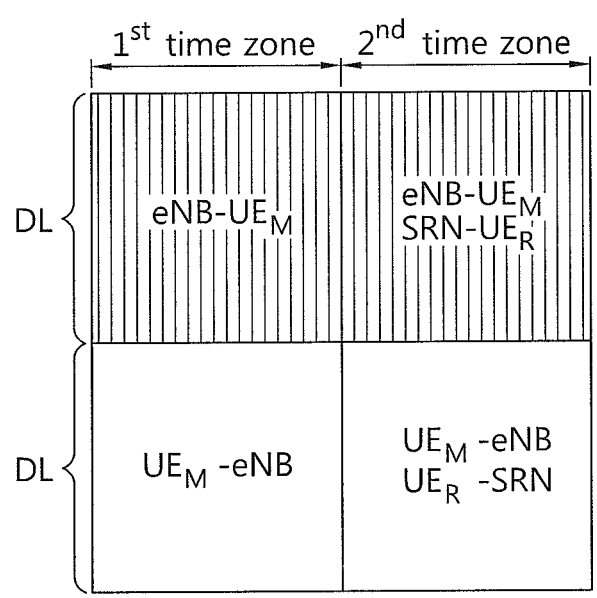
FIG. 5 shows the structure of a frame for a dynamic RA method based on an SRN to which an embodiment of this specification can be applied.

FIG. 5 shows the structure of a frame for a dynamic RA method based on an SRN to which an embodiment of this specification can be applied.

That is, FIG. 5 shows the structure of a frame in each time zone based on an SRN.

As shown in FIG. 5, in the downlink of a first time zone, an eNB sends a data packet to $UE_M$ and at the same time, an SRN overhears the packet transmitted by the eNB.

Even in a second time zone, the eNB sends a data packet to the $UE_M$, and the SRN performs relay transmission on only $UE_R$ in which NACK has occurred in the first time zone.

Here, the SRN uses resources allocated to the eNB-$UE_M$. Here, dynamic RA based on an SRN is applied to all Resource Blocks (RBs).

An eNB sends a common RS to $UE_M$ in order to implement the scheduling of an eNB-$UE_M$ link and obtain Channel Quality Indication (CQI) information about a corresponding band assigned to each resource region. Furthermore, the $UE_M$ calculates CQI from the received common RS and transfers the CQI to the eNB when corresponding uplink is opened up.

Meanwhile, in order to precisely decode a signal, in the eNB-SRN and the SRN-$UE_R$, source nodes send a dedicated Reference Signal (RS) to destination nodes. The destination nodes of each link can calculate CQI from the received dedicated RS and transfer the CQI to the source nodes when corresponding uplink is opened up.

Figure 6A:
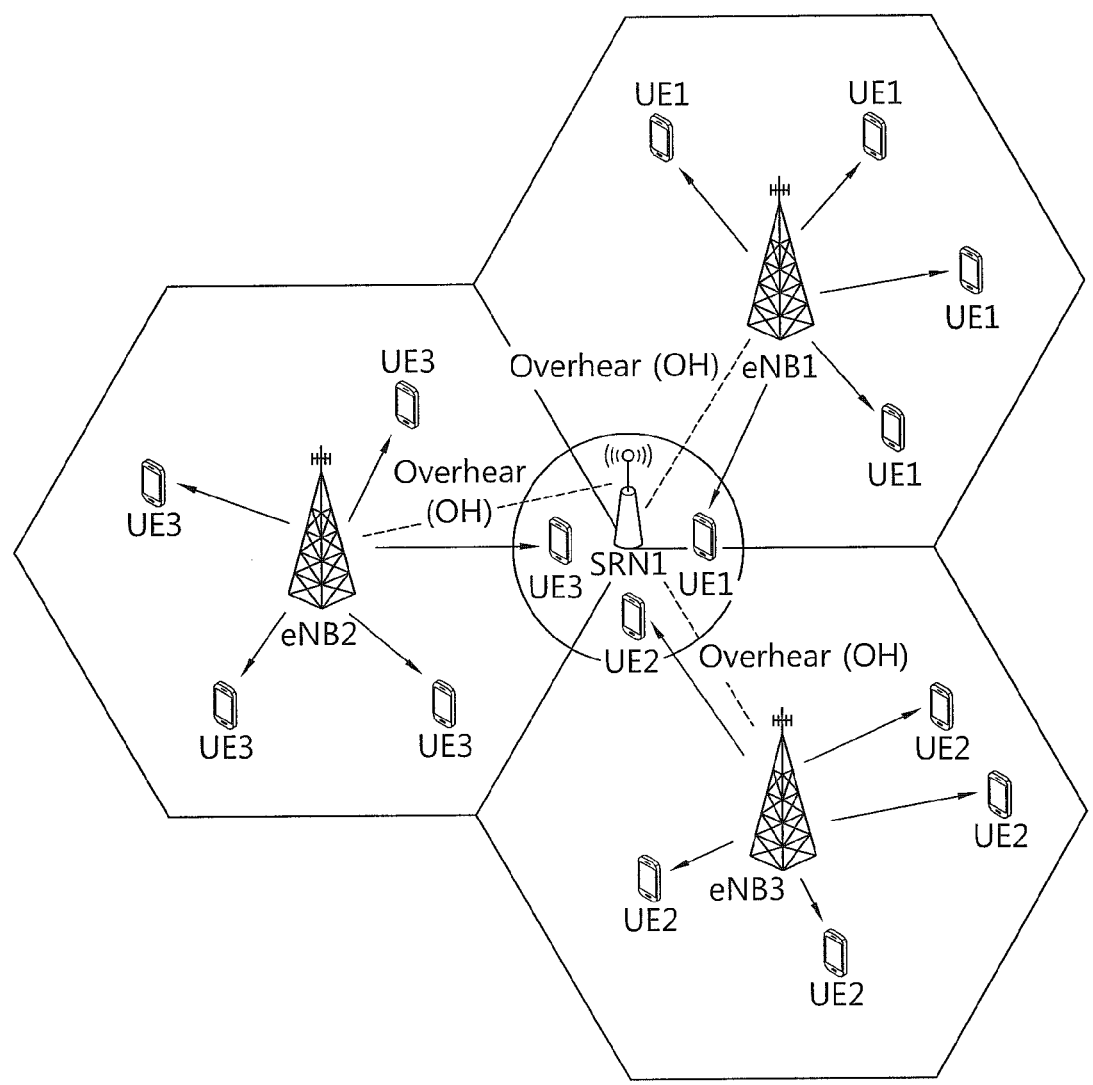
FIGS. 6(a) and 6(b) are diagrams showing a signal transmission operation in each time zone based on the SRN of FIG. 5.
Figure 6B:
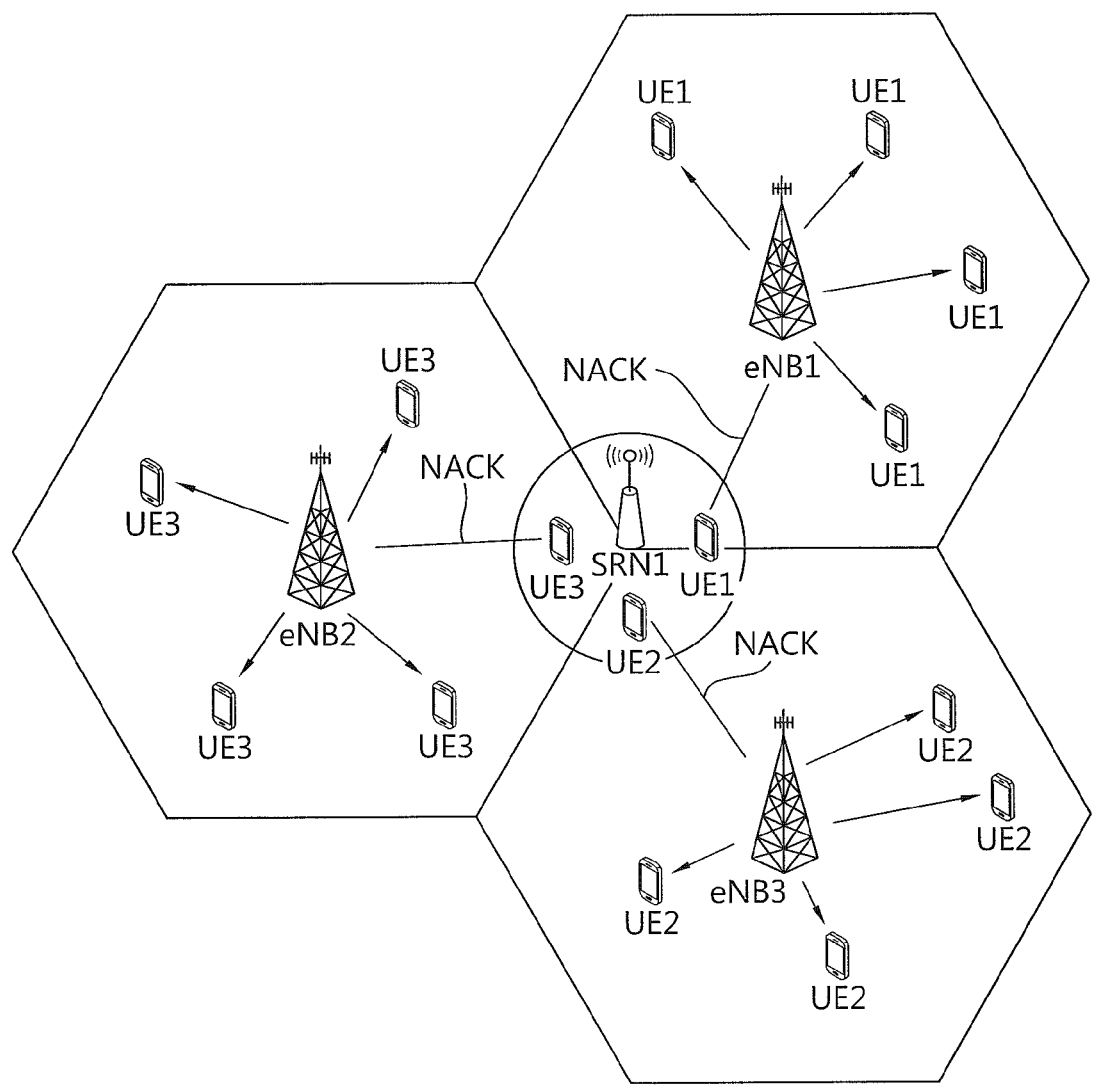

FIGS. 6(a) and 6(b) are diagrams showing a signal transmission operation in each time zone based on the SRN of FIG. 5.

As shown in FIG. 6a, in the first time zone, resources are allocated to eNB-$UE_M$, and each eNB sends a signal to UEs belonging thereto. Here, assuming that an SRN is fixed and a propagation path is excellent, the SRN perfectly overhears the signal transmitted from the eNB to the UEs.

Accordingly, resources for the eNB-SRN are not allocated because the SRN can perform signal transmission to the SRN-UE through overhearing even without a link between the eNB-SRN in the first time zone.

As shown in FIG. 6b, in the second time zone, signal transmission from the eNB to the UE is still valid, and signal transmission as the SRN→UE is valid only when NACK is generated in the eNB→the UE.

Furthermore, the operation of the SRN can be classified into a cooperative mode and a non-cooperative mode.

It is assumed that in the cooperative mode, the same resources are used in eNB→UE and in the non-cooperative mode, resources originally allocated from the eNB to the UE are used in the same manner. That is, a basis frame structure, such as FIG. 5, may be taken into consideration.

Figure 7:
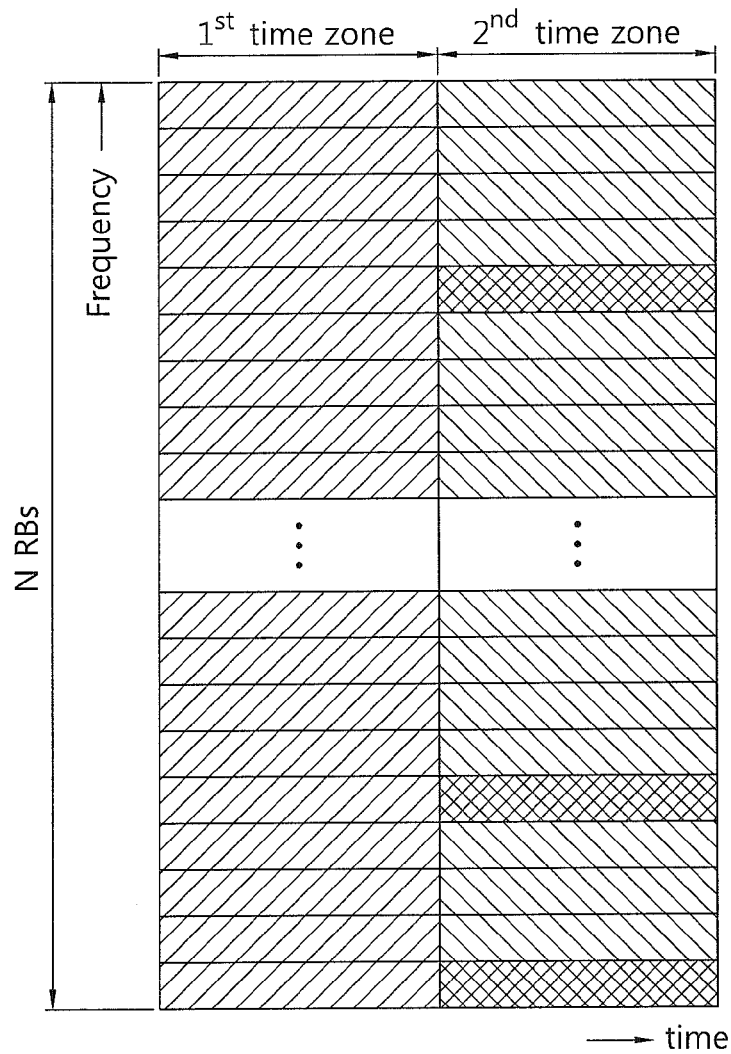
FIG. 7 is a diagram showing the dynamic RA method of each eNB in an SRN structure to which an embodiment of this specification can be applied.

FIG. 7 is a diagram showing the dynamic RA method of each eNB in an SRN structure to which an embodiment of this specification can be applied.

Each eNB takes a structure in which all RBs are dynamically allocated based on Full Frequency Reuse (FFR) into consideration and allocates RBs to UEs through a variety of scheduling schemes (e.g., PF, Max CINR, etc.).

As shown in FIG. 7, a method in which RBs do not overlap with each other is called non-overlap or non-cooperative. In the non-overlap method, an SRN takes only SRN-UE signal transmission without eNB-UE signal transmission.

Furthermore, in a resource overlap or cooperative method, the same signal is transmitted in eNB-UE and SRN-U using the same RB and a Diversity gain can be expected.

Figure 8A:
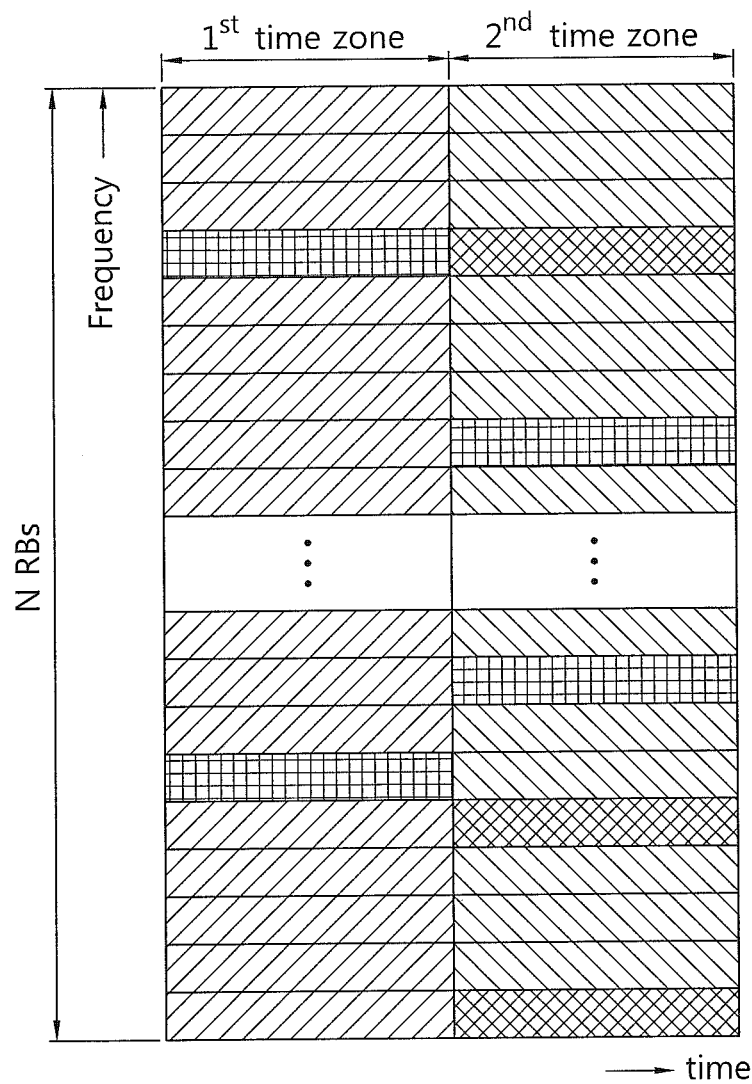
FIGS. 8(a) to 8(c) are diagrams showing a case where a collision is generated due to the same RB allocated to the terminals of a cell edge when each eNB uses a dynamic RA method.
Figure 8B:
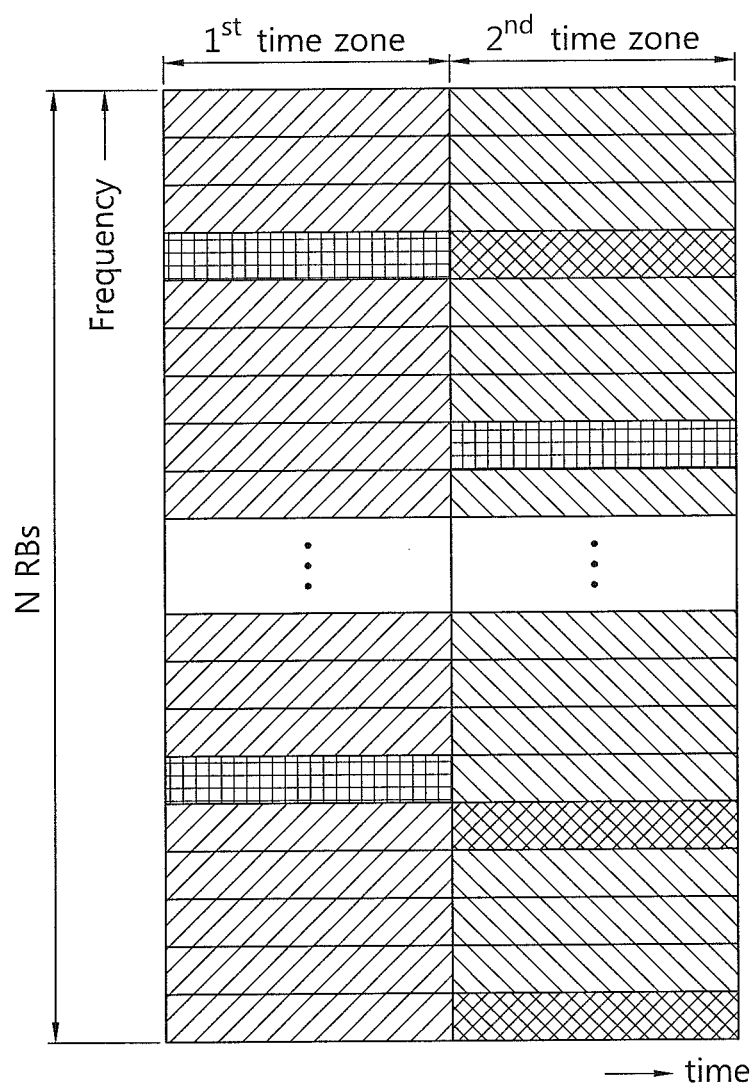
Figure 8C:
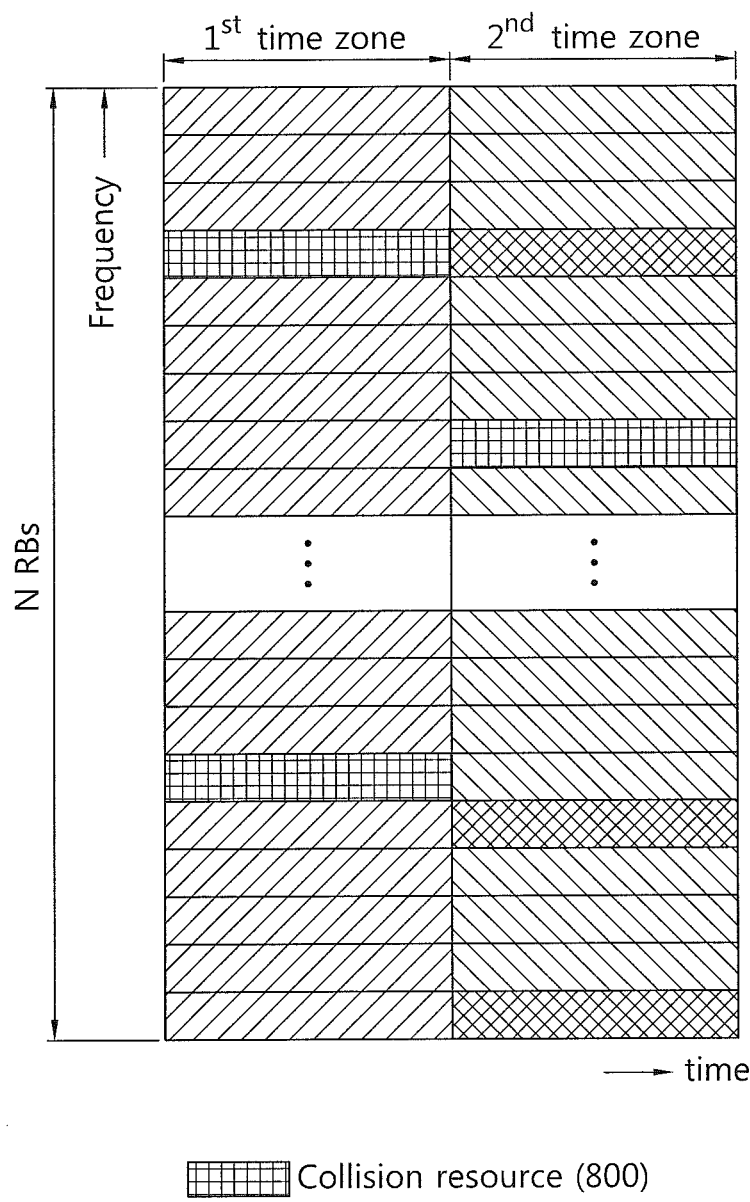

FIGS. 8(a) to 8(c) are diagrams showing a case where a collision is generated due to the same RB allocated to the UEs of a cell edge when each eNB uses a dynamic RA method.

As shown in FIGS. 8(a) to 8(c), a region 800 corresponding to a slanted part indicates a region where resources collide again each other. That is, in this case, if multiple cells take a dynamic RA method based on FFR into consideration, a collision occurs because UEs at a cell edge use the same RB.

A resource reallocation method based on an SRN for ICI avoidance in a dynamic RA method based on multi-cell FFR is described in detail below.

As described above, a resource reallocation method based on an SRN for ICI avoidance is provided using two basic advantages of an SRN.

First, an SRN is placed at the center of surrounding eNBs geographically.

This area where the SRN is placed is a cell boundary area of the eNBs and is an area where a collision between RBs is frequently generated and strong ICI from the surrounding eNBs is applied. Accordingly, the SRN has a geographical advantage in monitoring the generation of the ICI at the center of the area where ICI from several eNBs is strongly generated.

Second, the SRN can overhear signals between eNBs-UEs.

The SRN can overhear the signals between eNBs-UEs and precisely detect RBs where a collision is generated using downlink and uplink control signals from among the signals.

Method of avoiding ICI based on an SRN

First Embodiment

The first embodiment provides a method of an SRN overhearing a control channel between an eNB and UE and directly reallocating a resource region to a resource region where a collision is generated.

For the method of avoiding ICI according to the first embodiment, the following parameters are defined.

1. $UE_{a,b}$: $UE_b$ for $eNB_a$
2. $a \in \{1, \ldots, A\}$, and a and A are the index of $eNB_s$ and a total number
3. $b \in \{1, \ldots, B\}$, and b and B are the index of UE and a total number for each $eNB_a$ Furthermore, the UEs of the SRN can be classified as follows.

1. $S_c \in \{UE_{a,b} | UE_b$ for $eNB_a$ within the coverage of an SRN$\}$
2. $c \in \{1, \ldots, C\}$, and c and C are the indices and total number of UEs within the coverage of an SRN
3. $S_d = (S_C)^c \in \{UE_{a,b} | UE_b$ for $eNB_a$ outside the coverage of an SRN$\}$ 4. d∈{1, ..., D}, and d and D are the indices and total number of UEs outside the coverage of an SRN Furthermore, the index of an RB can be represented as follows.

1. RB(k): an index $k^{th}$ RB
2. k∈{1, ..., K}, and k and K are the indices and total number of RBs
3. $RB_{S_j}(l)$: an index $i^{th}$ RB for the UE of $S_c$
4. l∈{1,...,L}, and l and L are the indices and total number of RBs for the UE of $S_c$
5. $RB_{S_d}(m)$: an index $m^{th}$ RB for the UE of $S_d$
6. m∈{1, ..., M}, and m and M are the indices and total number of RBs for the UE of $S_d$ Furthermore, an SINR for each RB can be represented as follows.

$SINR_{RB(k)}$, $SINR_{RB(l)}$, and $SINR_{RB(m)}$ mean SINRs for respective $k^{th}$, $l^{th}$, and $m^{th}$ RBs.

An SRN searches for an RB having a collision in the area of the SRN using the parameters ad reallocates resources to the collision RB. That is, a resource reallocation method for collision avoidance in this specification can be basically divided into 1) a process of searching for a collision RB and 2) a resource reallocation process for avoiding a collision RB.

1) The process of searching for a collision RB and 2) the resource reallocation process for avoiding a collision RB are described in detail below.

Process of searching for a collision RB

Figure 9A:
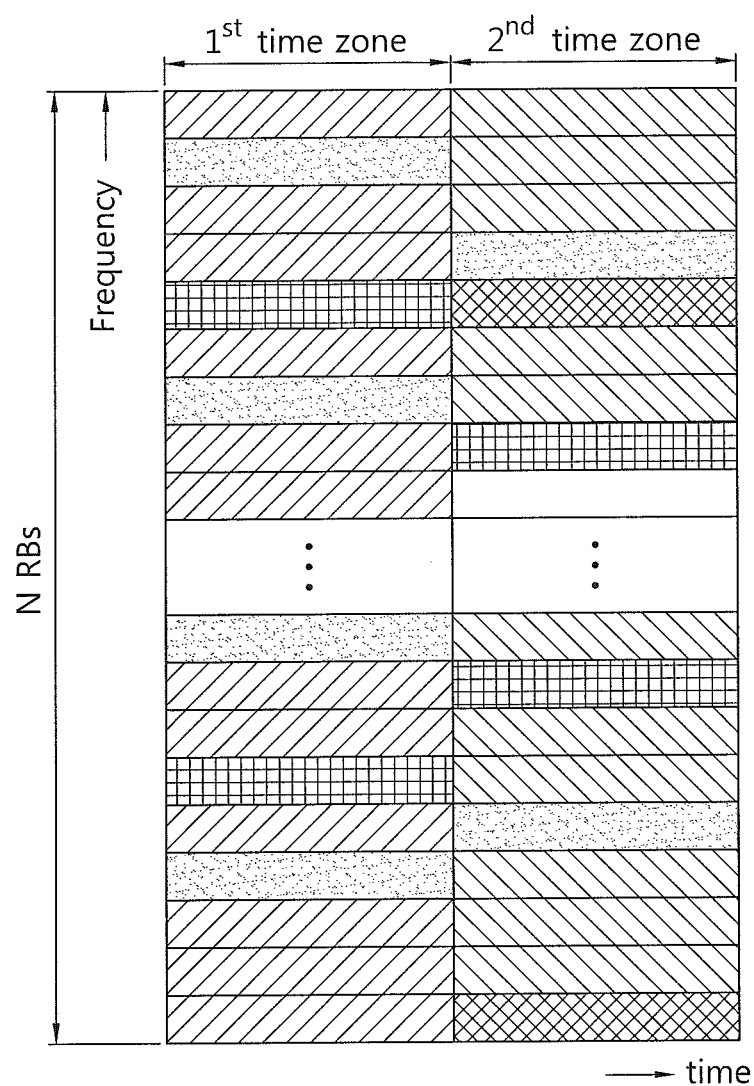
FIGS. 9(a) to 9(c) are diagrams showing the classification of RBs in a cell structure based on an SRN in accordance with a first embodiment of this specification.
Figure 9B:
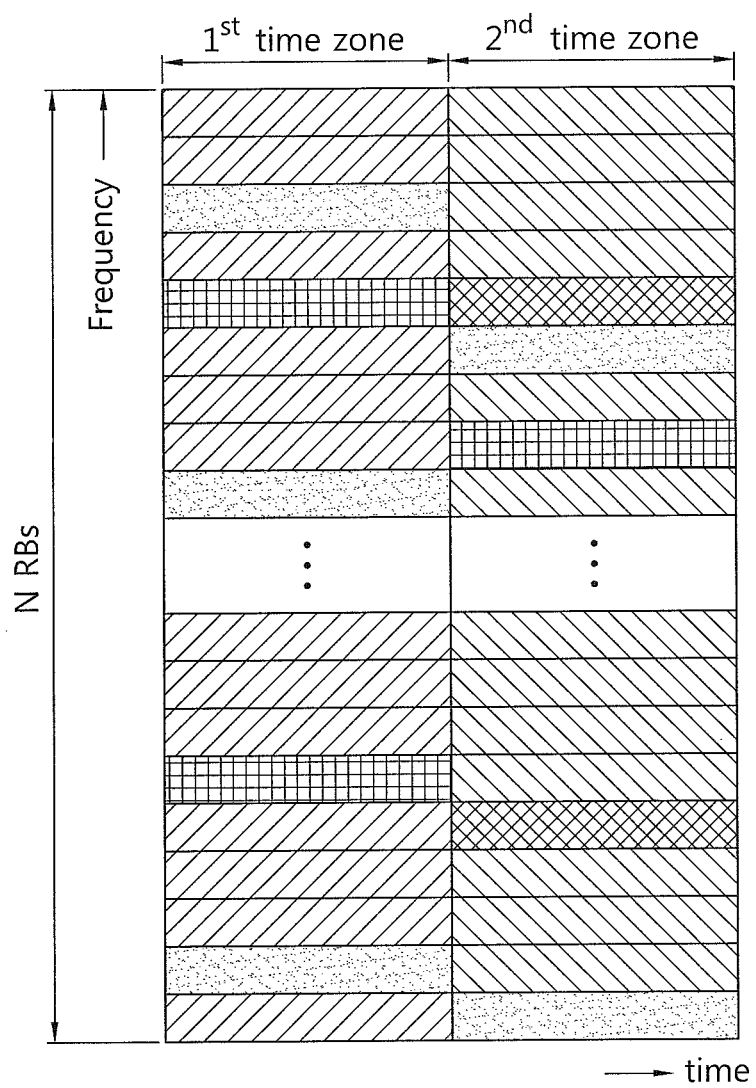
Figure 9C:
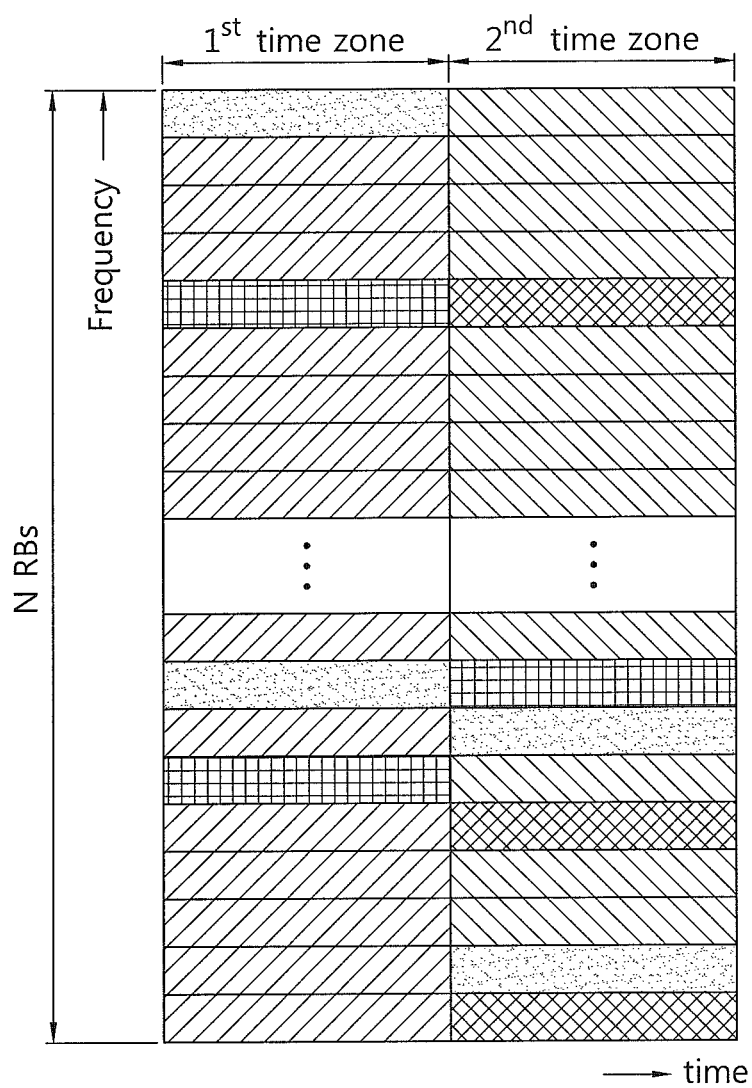

FIGS. 9(a) to 9(c) are diagrams showing the classification of RBs in a cell structure based on an SRN in accordance with a first embodiment of this specification.

The SRN compares the RBs of UEs within the $S_c$ of the SRN, that is, the coverage of the SRN, with each other and searches for an RB in which a collision has occurred. As shown in FIGS. 9a to 9c, RBs are indicated by an RB 920 for UE inside the coverage of the SRN and an RB 910 outside the coverage of the SRN. Here, if the RBs of UEs within the coverage of the SRN are identical with each other, the RBs are indicated by collision RBs 930.

A process of searching for a collision RB complies with the following process.

① Set $RB_{S_j}(l)$, $RB_{S_d}(m)$ at each $eNB_a$
② Mapping $RB^\alpha_{S_c}(l)$ into $RB^\alpha_{S_c}(k)$ at each $eNB_a$
For i=1:(A−1)
③ Find $RB^1_{S_c}(k)=RB^\alpha_{S_c}(k)$
④ Store collision_$k^i(q)\in\{\forall k|RB^i_{S_c}(k)==RB^\alpha_{S_c}(k)\}$
End Here, q∈{1, ..., Q}, and q and Q the indices and total number of collision RBs.

α satisfies α∈{∀a| except current i} and means all 'a's except current 'I'.

The process of ① to ④ is sequentially described below. In ①, $RB_{S_j}(l)$ and $RB_{S_d}(m)$ are set for each $eNB_a$.

In ②, an RB Index is mapped to k instead of I for each $eNB_a$.

In ③, all indices in which the UE of an SRN uses the same RB are searched for in relation to each $eNB_a$.

In ④, an index k in which a collision RB or each $eNB_a$ is generated is designated as a parameter collision_$k^i(q)$ and stored as a vector string.

Resource reallocation process for collision RB avoidance

A resource reallocation process for collision RB avoidance at a second step is described below.

That is, the second step proposes a method of blocking the generation of ICI between eNBs in a cell boundary area using a collision RB index obtained in the first step. In particular, in this step, a method of exchanging an RB in which a collision has occurred and an RB outside the coverage of an SRN is chiefly described.

The procedure of the second step complies with the following process.

For a=1:A
For q=1:Q
For m=1:M
① Mapping $RB^\alpha_{S_d}(m)$ into $RB^\alpha_{S_d}(k)$ at each $eNB_a$
② k'=Argmin|$SINR_{collision\ k^a(q)}-SINR_{RB}{}^\alpha_{S_d}(k)$|
③ Change a collision_$k^{th}$ RB into a $(k')^{th}$ RB
④ Update $RB^\alpha_{S_d}(m)\in\{RB^\alpha_{S_d}(m)|$ except mapped current $RB^\alpha_{S_d}(k')$ to avoid RB collision}
End
End
End In the first step, collision_ki(q) for each $eNB_a$ was calculated.

The second step proposes a method of removing a collision RB for each $eNB_a$ using the results in the first step.

The process of the second step is sequentially described below. First, in ①, $RB^\alpha_{S_d}(m)$ is mapped into $RB^\alpha_{S_d}(k)$ for each $eNB_a$.

In ②, a parameter k satisfying a corresponding equation |$SINR_{collision\ k^a(q)}-SINR_{RB}{}^\alpha_{S_d}(k)$| is defined as k'. Here, the equation is related to the type of SRN.

An SRN does not need to obtain a higher SINR in the RB of $S_d$ because it performs retransmission after recognizing NACK. That is, the equation has been exploded by taking the fact that the signal of the same MCS level is retransmitted into consideration.

④ is a process I which an RB subject to the exchange of RA is updated by an SRN. In particular, in the RB set of $S_d$, an area without ICI is taken into consideration unlike in the area of $S_c$.

The resource reallocation method of an SRN according to a first embodiment is described below.

First, parameters are set as follows.

A=3 ($UE_{1,b}$, $UE_{2,b}$, $UE_{3,b}$),
B=20 ($UE_{1,1-20}$, $UE_{1,1-20}$, $UE_{1,1-20}$),
C=10 ($UE_{1,2}$, $UE_{1,8}$, $UE_{1,11}$, $UE_{1,17}$, $UE_{2,9}$, $UE_{2,13}$, $UE_{2,14}$, $UE_{3,1}$, $UE_{3,6}$, $UE_{3,9}$)
D=50 (Except following these C=10)
K=50 (RB total index),
$L^{(1)}$=7, $L^{(2)}$=11, $L^{(3)}$=5, $M^{(1)}$=43, $M^{(2)}$=39, $M^{(3)}$=45

Figure 10:
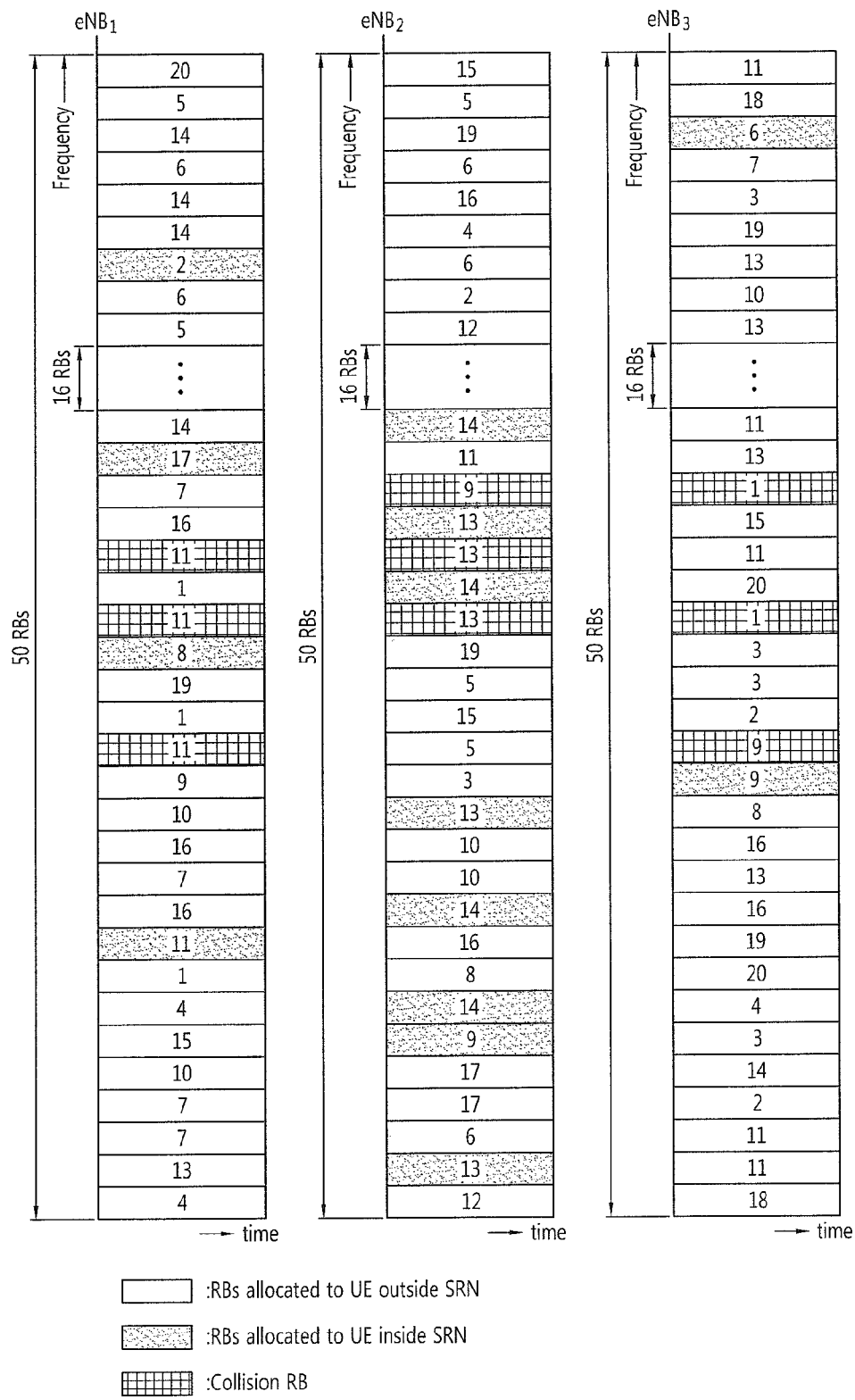
FIG. 10 is a diagram showing actual cases of collision RBs in a cell structure based on an SRN in accordance with the first embodiment of this specification.

FIG. 10 is a diagram showing actual cases of collision RBs in a cell structure based on an SRN in accordance with the first embodiment of this specification.

As shown in FIG. 10, assuming that an RB collision has occurred, a first step for searching for a collision RB can be represented as follows.

(1) Set $RB_{S_j}(l)$, $RB_{S_d}(m)$ at each $eNB_a$
: $RB^1_{S_c}(1)$, $RB^1_{S_c}(2)$, $RB^1_{S_c}(3)$, $RB^1_{S_c}(4)$, $RB^2_{S_c}(1)$, $RB^2_{S_c}(2)$, $RB^2_{S_c}(3)$, $RB^3_{S_c}(1)$, $RB^3_{S_c}(2)$, $RB^3_{S_c}(3)$
(2) Mapping $RB^\alpha_{S_c}(l)$ into $RB^\alpha_{S_c}(k)$ at each $eNB_a$
For i=1:(A−1)
: $RB^1_{S_c}(1)\to RB^1_{S_c}(7)$, $RB^1_{S_c}(2)\to RB^1_{S_c}(27)$, $RB^1_{S_c}(3)\to RB^1_{S_c}(30)$, $RB^1_{S_c}(4)\to RB^1_{S_c}(32)$, $RB^1_{S_c}(5)\to RB^1_{S_c}(33)$, $RB^1_{S_c}(6)\to RB^1_{S_c}(36)$, $RB^1_{S_c}(7)\to RB^1_{S_c}(42)$
: $RB^2_{S_c}(1)\to RB^2_{S_c}(26)$, $RB^2_{S_c}(2)\to RB^2_{S_c}(28)$, $RB^2_{S_c}(3)\to RB^2_{S_c}(29)$, $RB^2_{S_c}(4)\to RB^2_{S_c}(30)$, $RB^2_{S_c}(5)\to RB^2_{S_c}(31)$, $RB^2_{S_c}(6)\to RB^2_{S_c}(32)$, $RB^2_{S_c}(7)\to RB^2_{S_c}(38)$, $RB^2_{S_c}(8)\to RB^2_{S_c}(41)$, $RB^2_{S_c}(9)\to RB^2_{S_c}(44)$, $RB^2_{S_c}(10)\to RB^2_{S_c}(45)$, $RB^2_{S_c}(11)\to RB^2_{S_c}(49)$
: $RB^3_{S_c}(1)\to RB^3_{S_c}(3)$, $RB^3_{S_c}(2)\to RB^3_{S_c}(28)$, $RB^3_{S_c}(3)\to RB^3_{S_c}(32)$, $RB^3_{S_c}(4)\to RB^3_{S_c}(36)$, $RB^3_{S_c}(5)\to RB^3_{S_c}(37)$ For i=1:(A−1)

(3) Find $RB^i_{S_c}(k) == RB^\alpha_{S_c}(k)$ (4) Store collision_ki(q)∈{∀k|$RB^i_{S_c}(k) == RB^\alpha_{S_c}(k)$}

: $RB^1_{S_c}(30)$, $RB^1_{S_c}(32)$, $RB^1_{S_c}(36)$

: $RB^2_{S_c}(28)$, $RB^2_{S_c}(30)$, $RB^2_{S_c}(32)$

: $RB^3_{S_c}(28)$, $RB^3_{S_c}(32)$, $RB^3_{S_c}(36)$

End

An RB reallocation process through collision RB avoidance is described below through a second process based on a collision RB retrieved in the first step.

For a=1:A

For q=1:Q

For m=1:M (1) Mapping $RB^\alpha_{S_d}(m)$ into $RB^\alpha_{S_c}(k)$ at each $eNB_a$ (2) $k' = \text{Argmin}|SINR_{\text{collision } k^\alpha(q)} - SINR_{RB}{}^\alpha_{S_d}(k)|$ : Collision_$k^1$(1)=30, Collision_$k^1$(2)=32, Collision_$k^1$(3)=36

: Collision_$k^2$(1)=28, Collision_$k^2$(2)=30, Collision_$k^2$(3)=32

: Collision_$k^3$(1)=28, Collision_$k^3$(2)=32, Collision_$k^3$(3)=36

: $RB^1_{S_d}(k)$ are all RBs except $7^{th}$, $27^{th}$, $30^{th}$, $32^{nd}$, $33^{rd}$, $36^{th}$, and $42^{nd}$ RBs : $RB^2_{S_d}(k)$ are all RBs except $26^{th}$, $28^{th}$, $29^{th}$, $30^{th}$, $31^{st}$, $32^{nd}$, $38^{th}$, $41^{st}$, $44^{th}$, $45^{th}$, and $49^{th}$ RBs : $RB^3_{S_d}(k)$ are all RBs except $3^{rd}$, $28^{th}$, $32^{nd}$, $36^{th}$, and $37^{th}$ RBs (3) Change collision_$k^{th}$ RB into $(k')^{th}$ RB (4) Update $RB^\alpha_{S_d}(m) \in \{RB^\alpha_{S_d}(m)|$ except mapped current $RB^\alpha_{S_d}(k')$ to avoid an RB collision}

End

End

End

Figure 11:
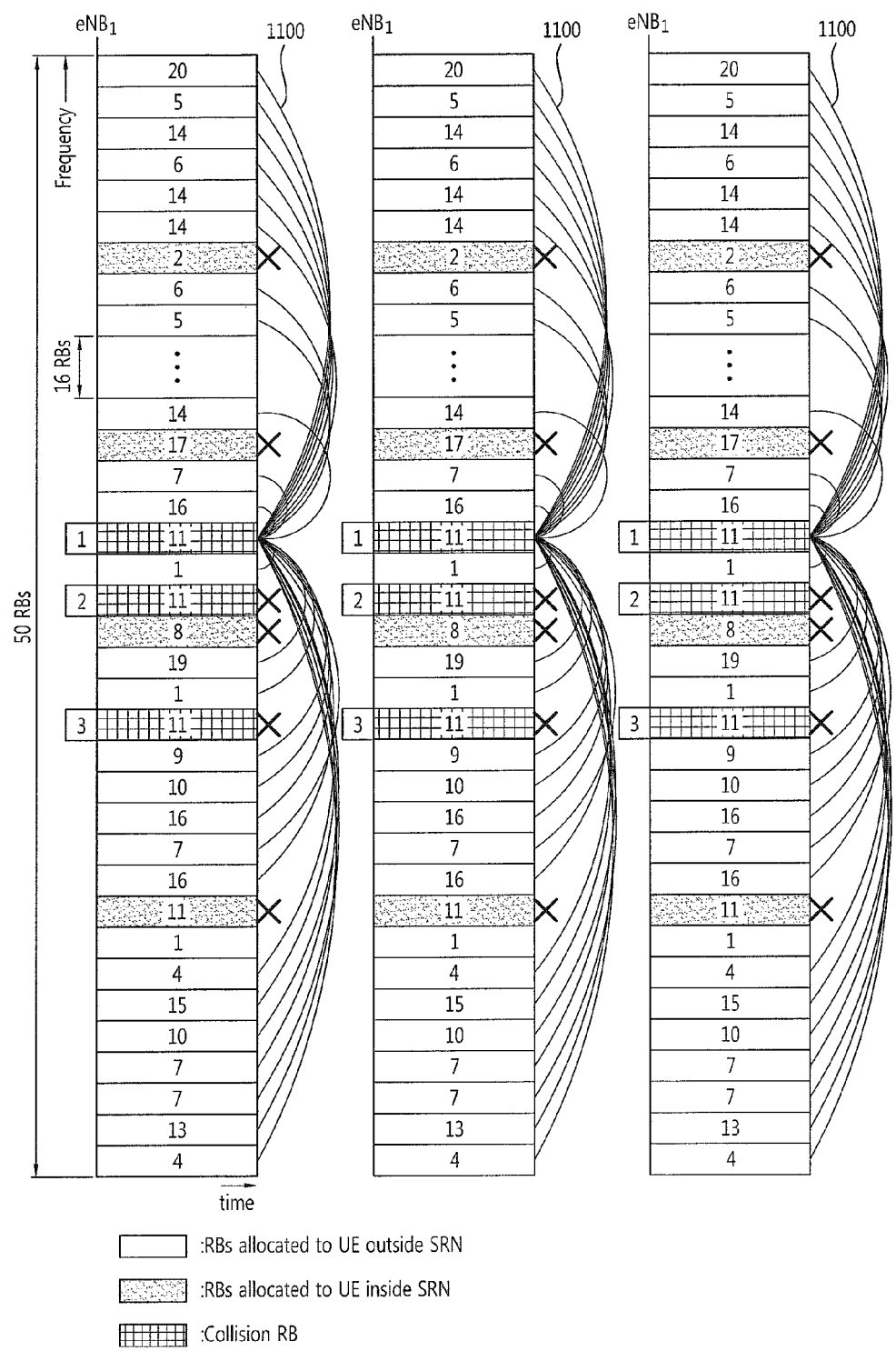
FIG. 11 is a diagram showing a resource reallocation process for avoiding collision RBs in the cell structure based on an SRN in accordance with the first embodiment of this specification.

FIG. 11 is a diagram showing a resource reallocation process for avoiding collision RBs in the cell structure based on an SRN in accordance with the first embodiment of this specification.

In the second step, the SINR of an RB having a collision for each eNB is compared with the SINR of the RB of UE not laced in the coverage of an SRN, an RB having the smallest difference is selected, and the RBs are exchanged, as shown in FIG. 11. A dark solid line 1100 indicates an RB that can be replaced with a collision RB.

Second Embodiment

The second embodiment proposes a method of reallocating collided resources by transferring information for preventing a collision between resource regions, allocated to UE by an SRN, to an eNB.

If resources for UEs within the coverage of an SRN collide against each other, an SRN can transfer information for preventing a collision between the resources to eNBs so that the eNBs reallocate resources to the UEs in order to prevent the resources from colliding against each other.

Here, the information transferred from the SRN to the eNBs are listed in 1 to 2 below.

1. UE identifications (IDs) within the coverage of the SRN

: As described above, the SRN can check UEs within the coverage of the SRN. Accordingly, the SRN checks UEs within the SRN and transfer the IDs of the corresponding UEs to the eNBs.

2. UE ID having a collision between resources

: The SRN transfers the IDs of UEs in which NACK has occurred (i.e., a collision has occurred between resources) to the eNBs while overhearing downlink and uplink signals transmitted and received between the eNBs and the UEs.

Accordingly, the eNBs each of which has received the two pieces of information from the SRN exchange the RBs of UEs in which NACK has occurred in order to prevent a collision between resources for the UEs.

Here, an RB to be exchanged is performed in an RB other than the RBs of UEs within the coverage of the SRN.

THIRD EMBODIMENT

The third embodiment provides a method of an SRN and eNBs together reallocating resources when a collision between resources is generated.

That is, the third embodiment provides a method in which an SRN processes resource allocation avoidance information partially and transfers the processed information to each eNB and each eNB reallocates resources in order to prevent ICI. A detailed method of the resource reallocation method according to the third embodiment can be performed as follows.

First, (1) all UEs within the SRN are classified into corresponding eNBs.

(2) The SRN calculates the number of UEs within the SRN for UEs served by each eNB proportionally.

(3) The SRN applies the proportion information calculated in (2) at a ratio of RBs and transfers the RB regions of SRN UEs to each eNB.

Here, the third embodiment is performed when a collision between resources is generated and can also prevent a collision in basic resource allocation by applying a method in which each eNB allocates resources so that a collision between the resources is not generated without an HARQ timing process.

That is, each eNB can prevent a collision when allocating resources by allocating the resources to UE according to the following methods.

(1) Each eNB receives a cell ID, correspond to each UE within an SRN, from the SRN and allocates resources to UEs using the cell ID. Particularly, First, the SRN overhears its own uplink SRS signal and determines UEs within the SRN. Next, the SRN checks the cell IDs of the UEs within the SRN and informs corresponding cells that the UEs are UEs within the SRN. (Here, it is assumed that resources have already been statically divided according to each cell.)

(2) The SRN classifies the UEs within the SRN based on each cell ID, classifies the UEs within the SRN according to corresponding cells, checks the number of UEs within the SRN in each cell, applies the number of UEs to the entire resource region proportionally, and informs a corresponding resource ratio by the cell. Accordingly, each eNB performs resource allocation to UEs. (i.e., a method of dynamically allocating resources according to the number of UEs within an SRN)

Figure 12:
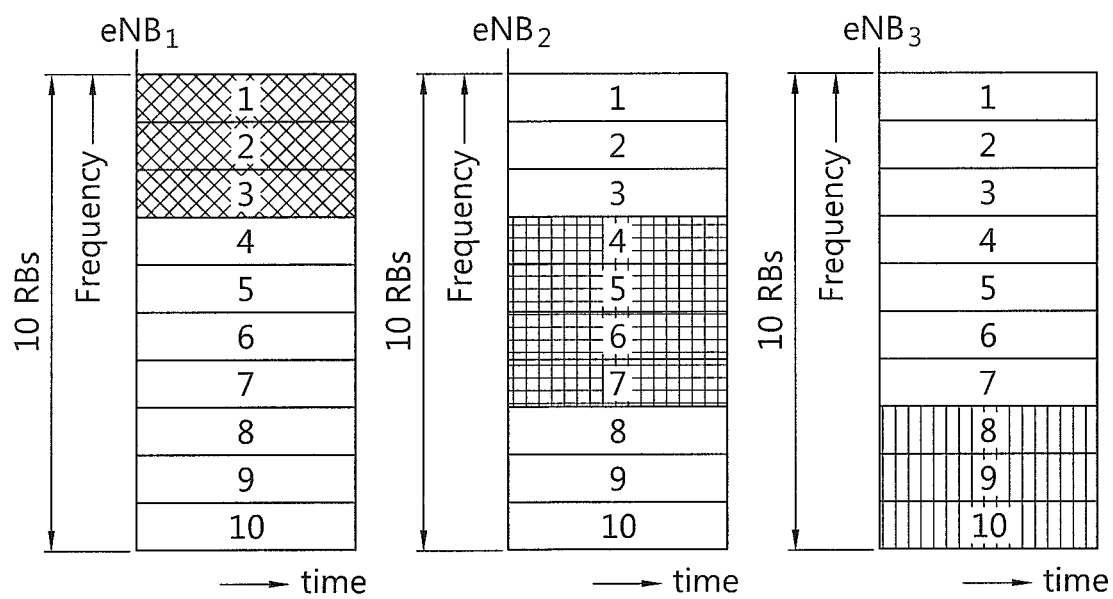
FIG. 12 is a diagram showing a resource reallocation method for avoiding ICI in accordance with a third embodiment of this specification.

FIG. 12 is a diagram showing a resource reallocation method for avoiding ICI in accordance with a third embodiment of this specification.

If the ratios of UEs served by eNBs are eNB1:eNB2:eNB3=3:4:3, RBs for UEs within the coverage of an SRN are allocated (1210, 1220, and 1230), as shown in FIG. 12.

That is, as shown in FIG. 12, the SRN transfers RBs allocated for UEs to each eNB, and each eNB first allocates RBs to UEs within the coverage of the SRN in a corresponding shadow area and dynamically allocates the remaining RBs to all other UEs.

A method of an SRN performing an HARQ timing process is described in detail below based on the functions of an SRN and the method of avoiding ICI (the first embodiment to the third embodiment).

1. An SRN can apply a method of avoiding ICI as follows in an HARQ timing process.
   (1) Centralized Method
   : A method of an SRN solely performing a method of avoiding ICI.
   (2) Distributed Method
   : A method of an SRN and an eNB together performing a method of avoiding ICI.
   (3) UEs which have sent ACK or NACK are targets
   (4) Only UEs which have sent NACK are targets The (1) and (2) are cases classified from a viewpoint of the subject that performs an algorithm for ICI avoidance, and the (3) and (4) are cases classified from a viewpoint of UEs, that is, targets for the algorithm for ICI avoidance.

Furthermore, the case (2) can be divided into 1) a case where an SRN and an eNB together perform a method of avoiding ICI and 2) a case where an SRN sends only information necessary to perform a method of avoiding ICI to an eNB and the eNB performs a method of avoiding ICI.

2. An SRN can perform an uplink HARQ timing process as follows.
   (1) Cooperative mode
   : A method of retransmitting an uplink signal along with UE.
   (2) Non-cooperative mode
   : A method of only an SRN or UE retransmitting an uplink signal.

3. An SRN can perform an HARQ timing process as follows.
   (1) Frequency Division Duplex (FDD) mode
      1) Full-duplex method
      2) Half-duplex method
   (2) Time Division Duplex (TDD) mode A case where an SRN performs an HARQ timing process using a method of avoiding ICI is described in detail with reference to the drawings through the 1 to 3.

Since an SRN shares a plurality of (e.g., 3) eNBs, ACK or NACK signals transmitted and received between each eNB and UE are shown in each figure indicative of an HARQ timing process.

Meanwhile, in an uplink HARQ timing process of this specification, an example in which if each eNB requests the retransmission of a PUSCH signal because it fails in decoding a PUSCH after the PUSCH signal is transmitted to the eNB, the eNB performs the retransmission using a PDCCH (i.e., an UL grant for retransmission, NDI=0) is described below.

FIGS. 13(a) to 13(d) are diagrams showing the HARQ timing process of an SRN in accordance with another embodiment of this specification.

FIGS. 13a to 13d show a method in which an SRN retransmits a signal along with UE cooperatively or non-cooperatively by performing the ICI avoidance process when ICI has occurred in UEs for each eNB in a cell boundary area, that is, ICI has occurred because eNB1-UE1, eNB2-UE2, and eNB3-UE3 use the same resources.

Figure 13A:
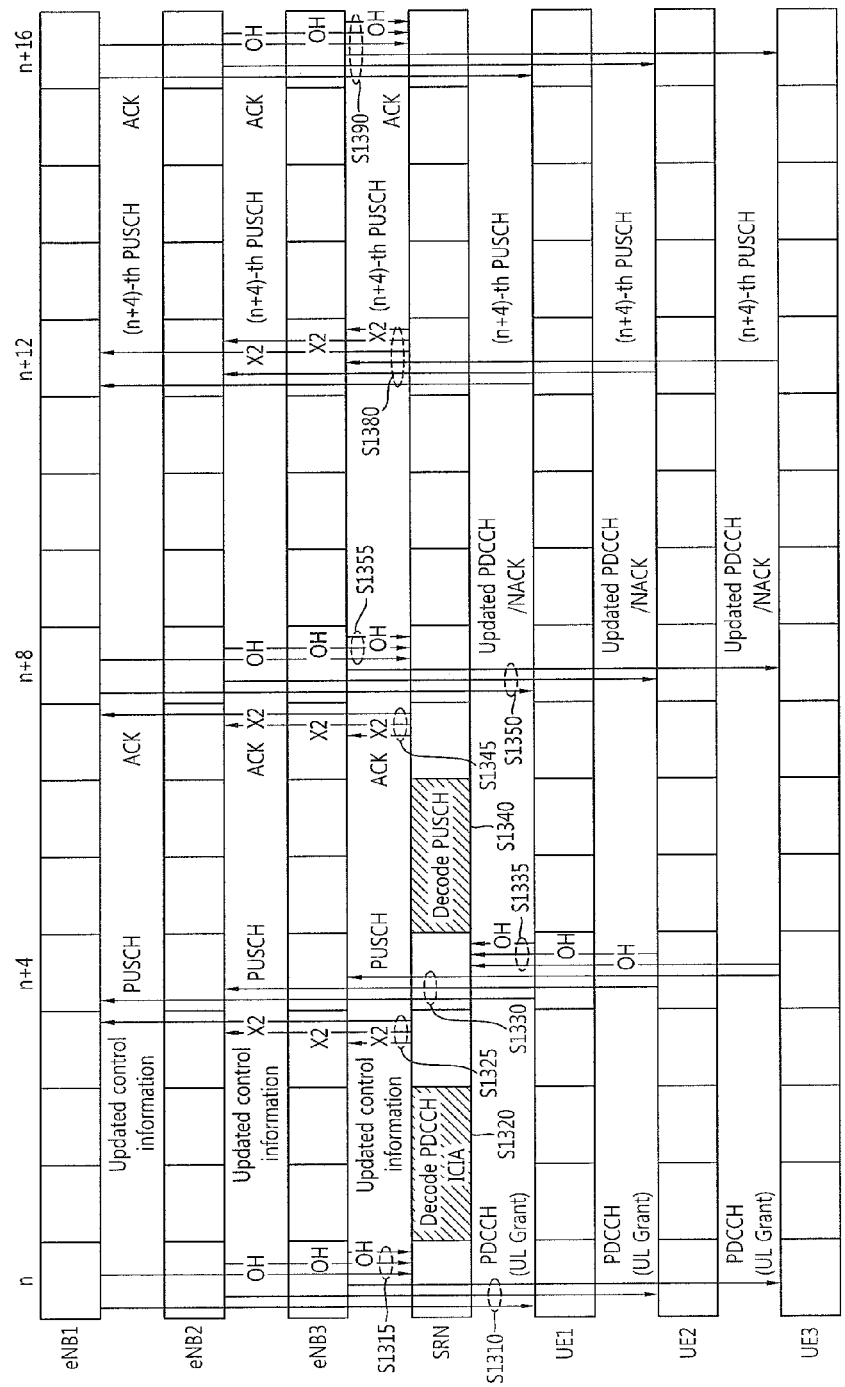
FIGS. 13(a) to 13(d) are diagrams showing the HARQ timing process of an SRN in accordance with another embodiment of this specification.

First, FIG. 13a shows an HARQ timing process in which only an SRN performs an ICI avoidance process and retransmits an uplink signal cooperatively with UE.

Referring to FIG. 13a, each of eNBs eNB1, eNB2, and eNB3 sends a PDCCH to UE within the coverage of the eNB in an $n^{th}$ subframe (S1310). That is, the eNB1 sends the PDCCH to UE1, the eNB2 sends the PDCCH to UE2, and the eNB3 sends the PDCCH to UE3. Here, the PDCCH includes an UL grant. Here, each eNB forms one cluster.

The SRN overhears the PDCCH transmitted from each eNB to the UE in the $n^{th}$ subframe (S1315).

Next, the SRN decodes the PDCCHs in an $(n+1)^{th}$ subframe to an $(n+2)^{th}$ subframe. If a collision has occurred between resource regions as a result of the decoding of the PDCCHs, the SRN performs an operation for ICI avoidance (S1320). The operation is indicated by "ICIA" in the figure, and the operation for ICI avoidance has been described with reference to FIGS. 8 to 12. Here, the ICI avoidance process (i.e., resource reallocation process) may mean that the SRN generates a PDCCH including new resource allocation information for each UE.

Next, in an $(n+3)^{th}$ subframe, the SRN sends an updated PDCCH to each eNB by executing the ICI avoidance process (S1325). Here, X2 signaling can be used.

Next, in an $(n+4)^{th}$ subframe, each UE sends a PUSCH to a corresponding eNB (S1330). Here the SRN overhears the PUSCHs transmitted by all the UEs (S1335). Next, the SRN decodes the overheard PUSCHs in an $(n+5)^{th}$ subframe to an $(n+6)^{th}$ subframe (S1340). Here, the SRN can store decoded information (i.e., the PUSCH).

Next, the SRN sends ACK or NACK indicating whether or not the decoding has been successfully performed to the eNBs (S1345).

Next, in an $(n+8)^{th}$ subframe, the eNB sends a response to an updated PDCCH and the received PUSCH, received from the SRN, to each UE (S1350). The response is ACK or NACK. In the case of a cooperative transmission mode between the SRN and the UEs, the eNB sends a NACK signal to the UEs. The SRN overhears the signal transmitted by each eNB in the $(n+8)^{th}$ subframe (S1355).

Next, in an $(n+12)^{th}$ subframe, the UEs and the SRN retransmit the PUSCH signal in the $(n+4)^{th}$ subframe cooperatively (S1380). If the retransmitted PUSCH is normally received, each eNB sends ACK in an $(n+16)^{th}$ subframe (S1390).

Figure 13B:
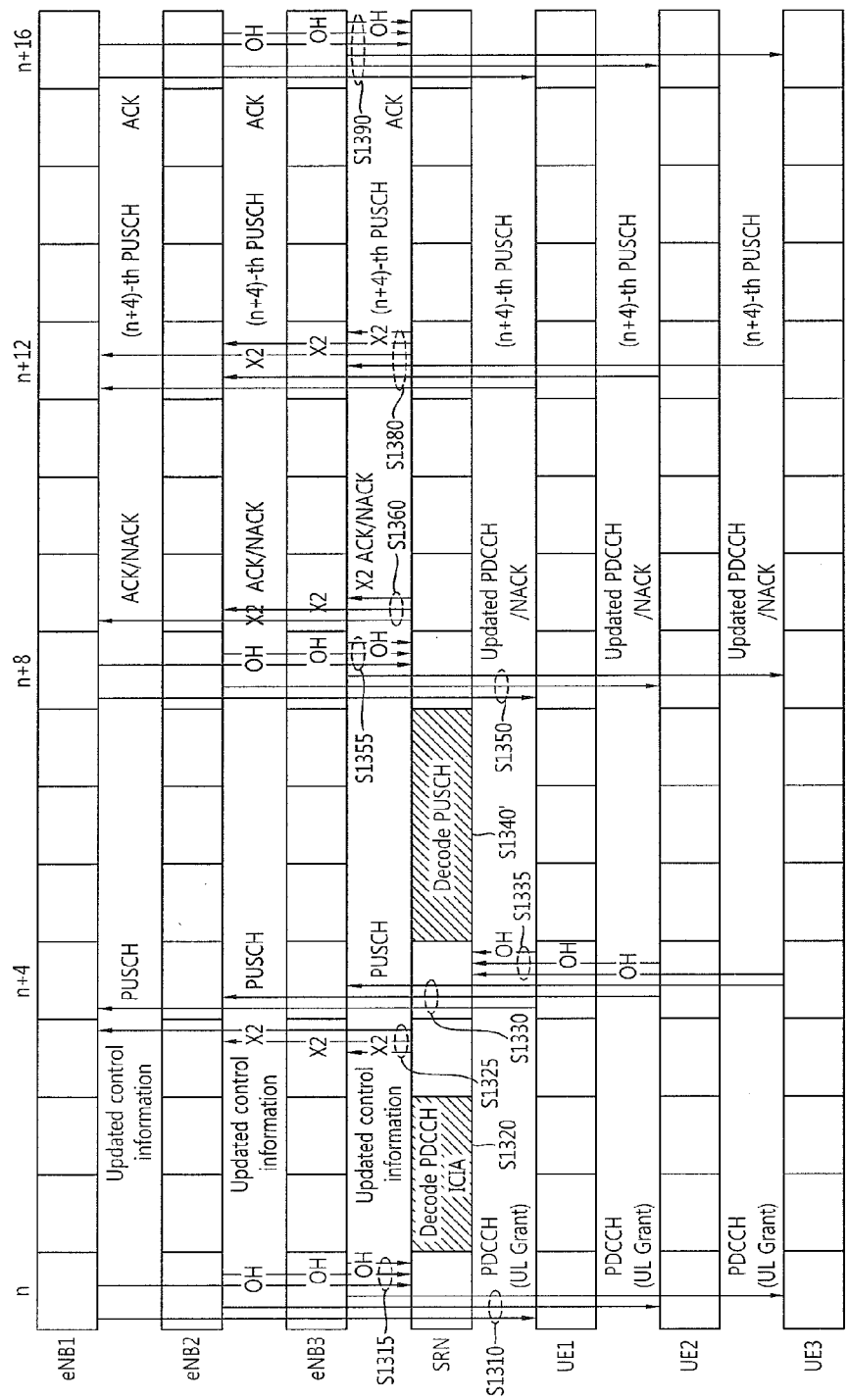

FIG. 13b shows another embodiment of an HARQ timing process in which only an SRN performs an ICI avoidance process and retransmits an uplink signal cooperatively with UE.

Processes from S1310 to S1390 are the same as those of FIG. 13a. A difference is as follows. An SRN decodes the overheard PUSCHs in an $(n+5)^{th}$ subframe to an $(n+7)^{th}$ subframe (S1340'). Furthermore, the SRN overhears a signal transmitted by each eNB in an $(n+8)^{th}$ subframe (S1355) and sends the success or failure of the decoding to each eNB (S1360).

Figure 13C:
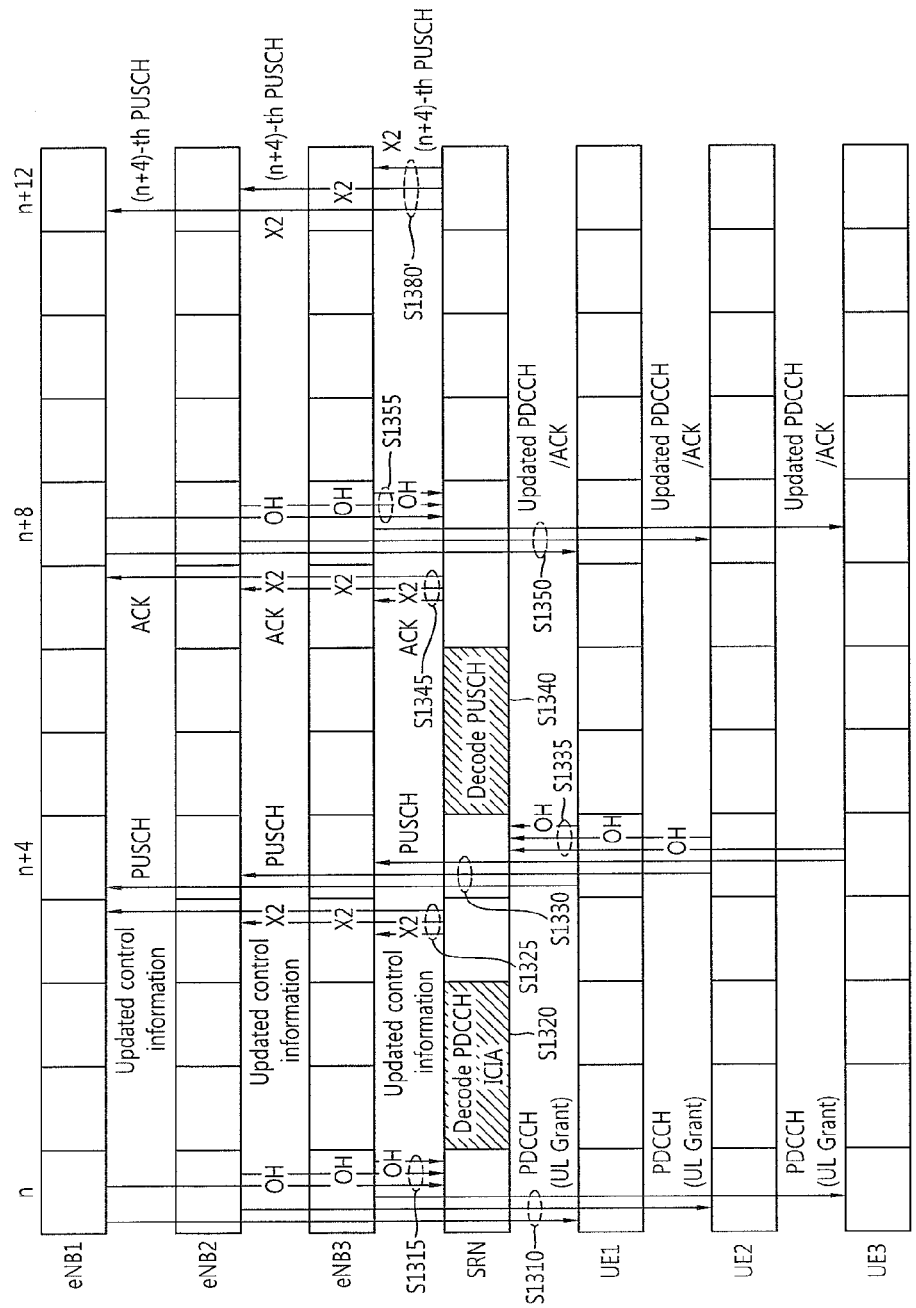

FIG. 13c shows an HARQ timing process in which only an SRN performs an ICI avoidance process and the SRN retransmits an uplink signal non-cooperatively.

Processes from S1310 to S1355 are the same as those of FIG. 13a. In the case of FIG. 13a, the UE and the SRN together have retransmitted the signal of the $(n+4)^{th}$ subframe in the $(n+12)^{th}$ subframe, but in the case of FIG. 13c, only the SRN retransmits the signal of the $(n+4)^{th}$ subframe (S1380').

As described above, UE has to receive an ACK signal prior to the $(n+8)^{th}$ subframe in order to operate in a non-cooperative mode. However, the UE cannot receive the ACK signal prior to the $(n+8)^{th}$ subframe because the UE performs fixed transmission and reception operations in determined subframes. Accordingly, in this specification, a method in which an eNB always sends ACK to UEs in the $(n+8)^{th}$ subframe irrespective of whether or not the eNB has successfully received a PUSCH in order to operate in a non-cooperative mode is taken into consideration. UE which has received ACK in the $(n+8)^{th}$ subframe determines that the eNB has normally received the PUSCH and does not attempt retransmission in the $(n+12)^{th}$ subframe.

Figure 13D:
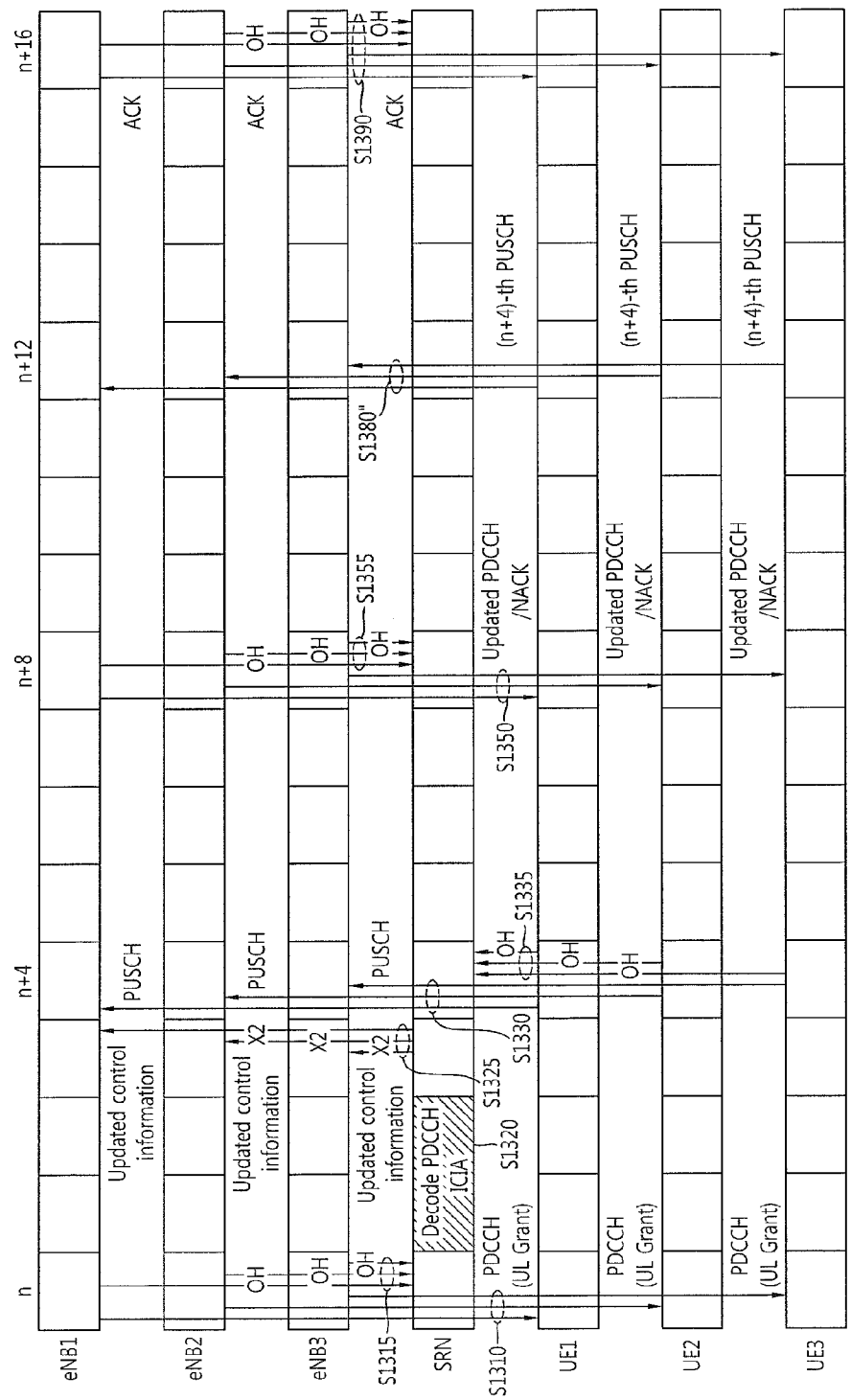

FIG. 13d shows an HARQ timing process in which only an SRN performs an ICI avoidance process and UE retransmits an uplink signal non-cooperatively.

Processes from S1310 to S1355 are the same as those of FIG. 13b. In the case of FIG. 13b, UE and an SRN together have retransmit the signal of the $(n+4)^{th}$ subframe in the $(n+12)^{th}$ subframe, but in the case of FIG. 13d, only UE retransmits the signal of the $(n+4)^{th}$ subframe (S1380").

In the non-cooperative HARQ timing process, it is a precondition that a link between UE and an eNB guarantees sufficient communication performance in an $(n+12)^{th}$ subframe using the updated PDCC in the $(n+8)^{th}$ subframe.

In a common non-cooperative HARQ timing process, an SRN retransmits a signal, whereas UE retransmits a signal in FIG. 13d. This is because an SRN is placed in an interference region between several cells and the SRN overhears an uplink signal between UE and an eNB having a high possibility that interference will occur. As a result, in the case of FIG. 13d, the SRN does not decode a PUSCH because there is a low possibility that the SRN will normally decode an uplink signal between UE and an eNB (having a high possibility that interference will have been occurred) in the $(n+4)^{th}$ subframe. In order to guarantee retransmission from the UE to the eNB in the $(n+12)^{th}$ subframe, the SRN performs an ICI avoidance operation and then transfers updated control information to eNBs. Accordingly, the performance of the non-cooperative HARQ timing process described with reference to FIG. 13d is guaranteed.

Figure 14A:
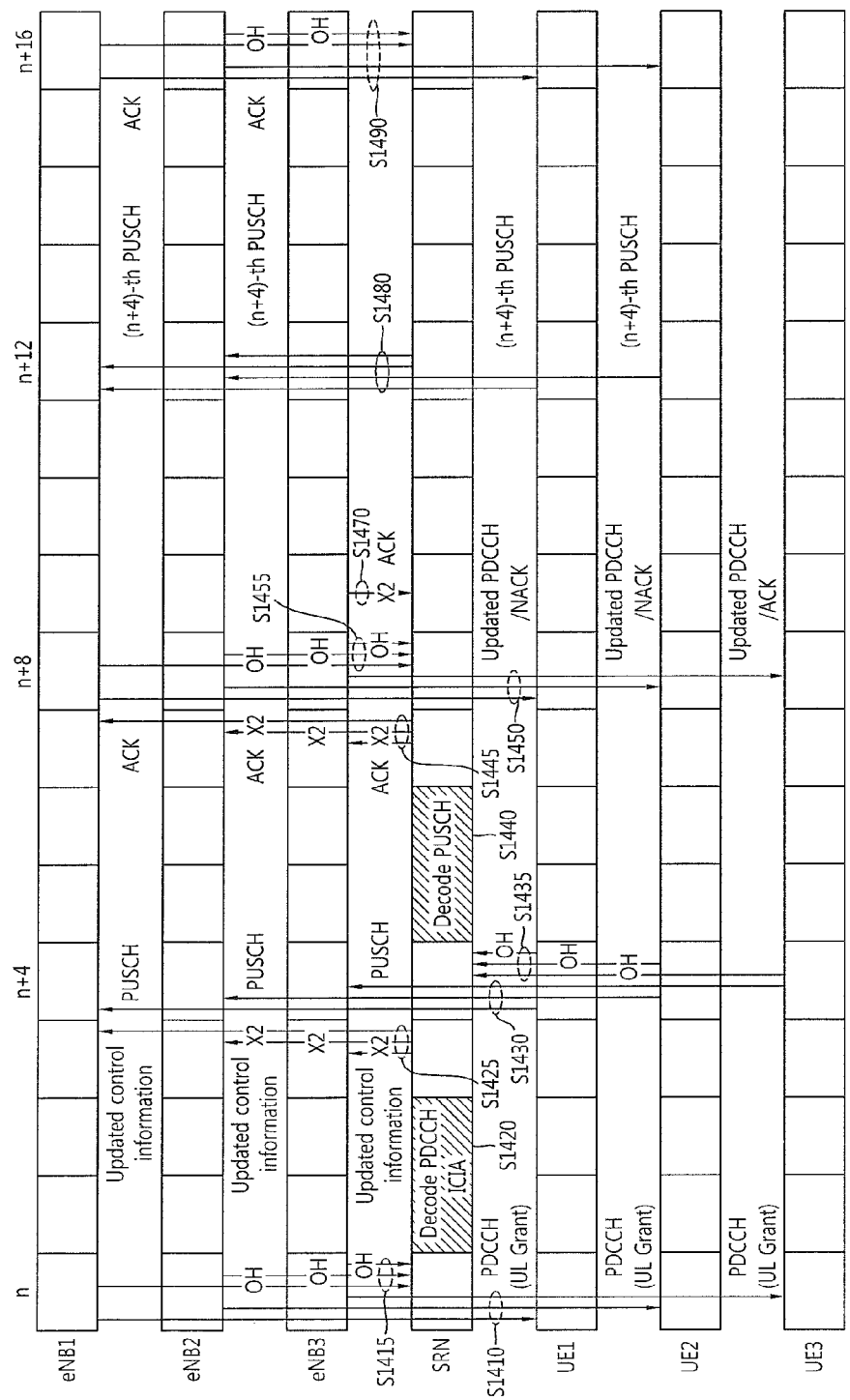
FIGS. 14(a) and 14(b) are diagrams showing the HARQ timing process of an SRN in accordance with another embodiment of this specification.
Figure 14B:
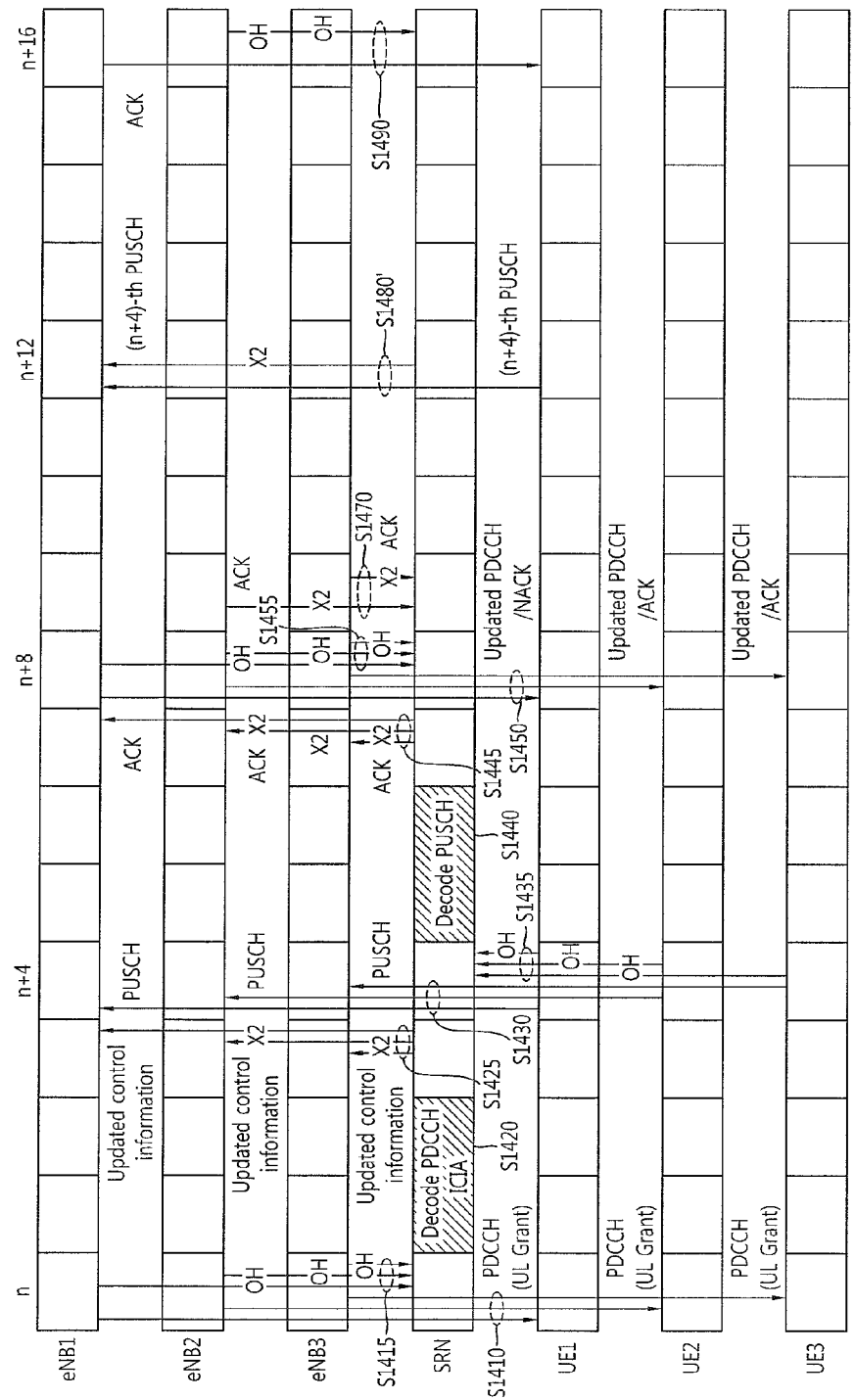

FIGS. 14(a) and 14(b) are diagrams showing the HARQ timing process of an SRN in accordance with another embodiment of this specification.

FIG. 14a shows an HARQ timing process in which only an SRN performs an ICI avoidance process and retransmits an uplink signal cooperatively with UE.

FIG. 14a shows a method in which an SRN sends a signal cooperatively with an eNB by performing the ICI avoidance process when ICI is generated between two eNB-UE links in a cell boundary area, that is, when ICI is generated because eNB1-UE1 and eNB2-UE2 use the same resources.

Processes from S1410 to S1445 are performed like the processes from S1310 to S1345 in FIG. 13a. If the eNB3 normally receives a PUSCH and sends ACK (S1450), however, the SRN does not retransmit the PUSCH to the eNB3 in the $(n+12)^{th}$ subframe (S1480).

As described above with reference to FIG. 13c, if the eNB3 sends ACK to the UE3 in the $(n+8)^{th}$ subframe, it is assumed as a non-cooperative retransmission mode. Here, whether ACK will be transmitted so that the eNBs operate in the non-cooperative mode or whether the ACK signal is transmitted because a PUSCH has been normally performed is important. In the latter case, this is because even the SRN does not need to retransmit the PUSCH to the eNBs. In the case of FIG. 14a, the SRN does not need to retransmit the PUSCH in the $(n+12)^{th}$ subframe because the eNB3 considers that the PUSCH signal has been normally decoded. Accordingly, the eNB3 sends an ACK signal, informing that the decoding of the PUSCH has been normally performed, to the SRN in the $(n+9)^{th}$ subframe in relation to ACK having two meanings, that is, in order to distinguish a non-cooperative mode or the normal decoding of the PUSCH (S1470). The SRN receives the ACK signal from the eNB3 in the $(n+9)^{th}$ subframe and does not attempt retransmission from the SRN to the eNB3 in the $(n+12)^{th}$ subframe. In the $(n+12)^{th}$ subframe, the SRN, together with the UE2 and the UE3, cooperatively retransmit the PUSCH.

FIG. 14b shows an HARQ timing process in which only an SRN performs the ICI avoidance process and retransmits an uplink signal cooperatively with UE.

FIG. 14b shows a method in which an SRN sends a signal cooperatively with UE by performing an ICI avoidance process when ICI is generated in one link between an eNB and UE in a cell boundary area, that is, when one NACK signal has occurred because only an eNB1 has not normally received a signal.

Processes from S1410 to S1490 are performed like the processes from S1410 to S1490 of FIG. 14a. In the case of FIG. 14b, unlike in the case of FIG. 14a, only the SRN and the UE1 retransmit the PUSCH of the $(n+4)^{th}$ subframe because only the eNB1 has sent NACK in the process of S1450 (S1480').

In this case, since the eNB2 and the eNB3 take a case where the PUSCH has been normally received into consideration as in the case of FIG. 14a, the eNB2 and the eNB3 send an ACK signal, informing that the decoding of the PUSCH has been normally performed, to the SRN in the $(n+9)^{th}$ subframe (S1470). Accordingly, the SRN does not attempt retransmission to the eNB2 and the eNB3 in the $(n+12)^{th}$ subframe. In the $(n+12)^{th}$ subframe, the SRN retransmits the PUSCH cooperatively with the UE1.

Figure 15A:
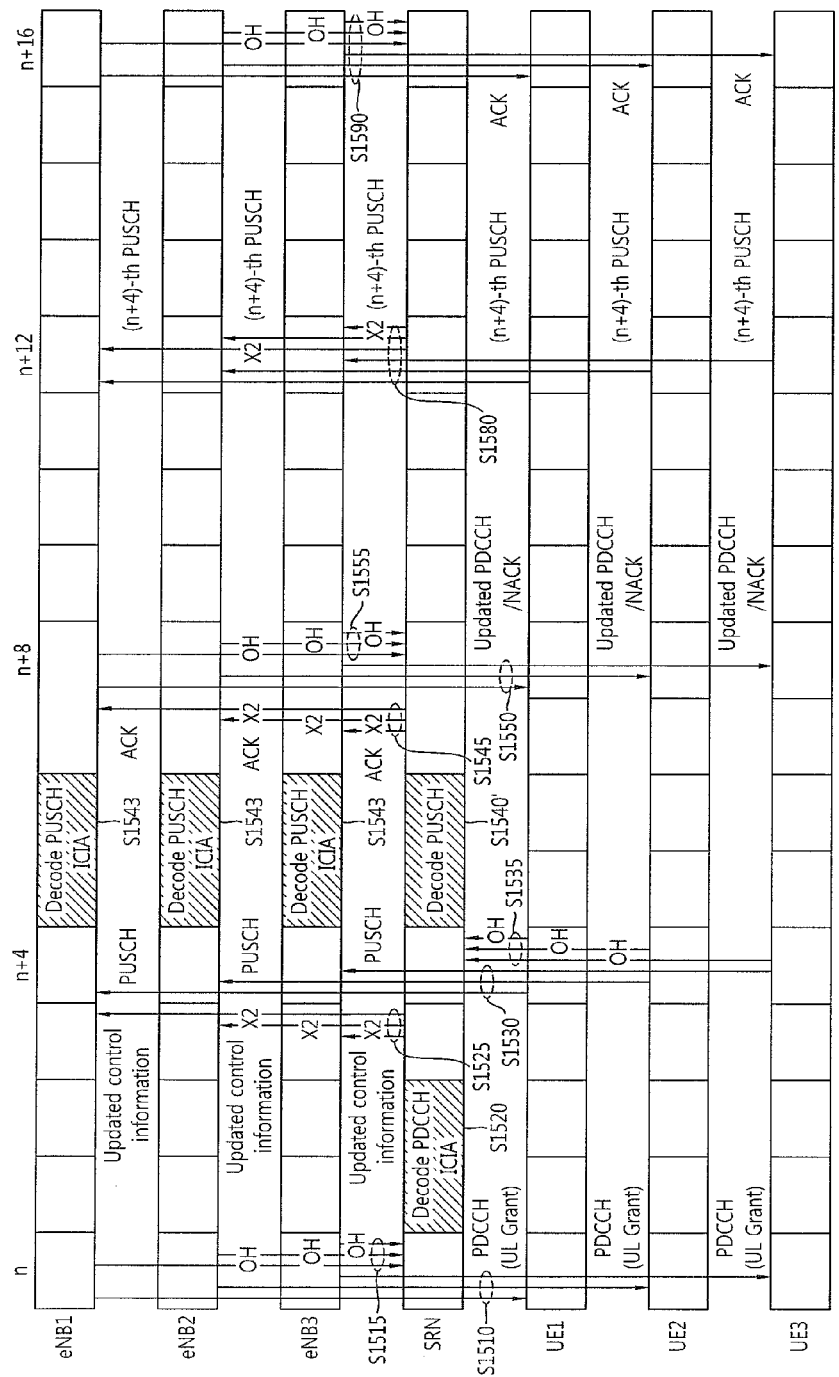
FIGS. 15(a) to 15(c) are diagrams showing the HARQ timing process of an SRN in accordance with yet another embodiment of this specification.
Figure 15B:
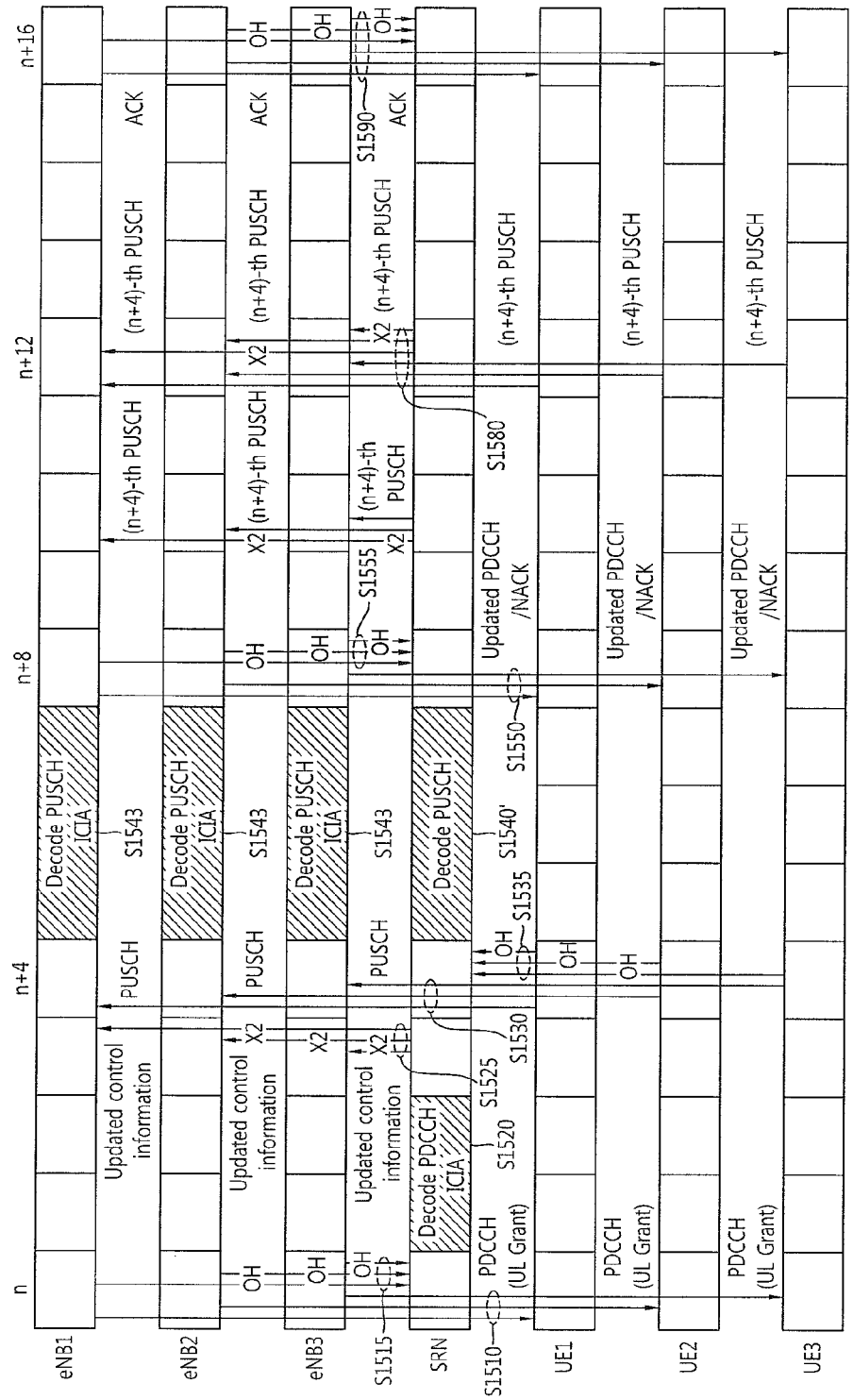
Figure 15C:
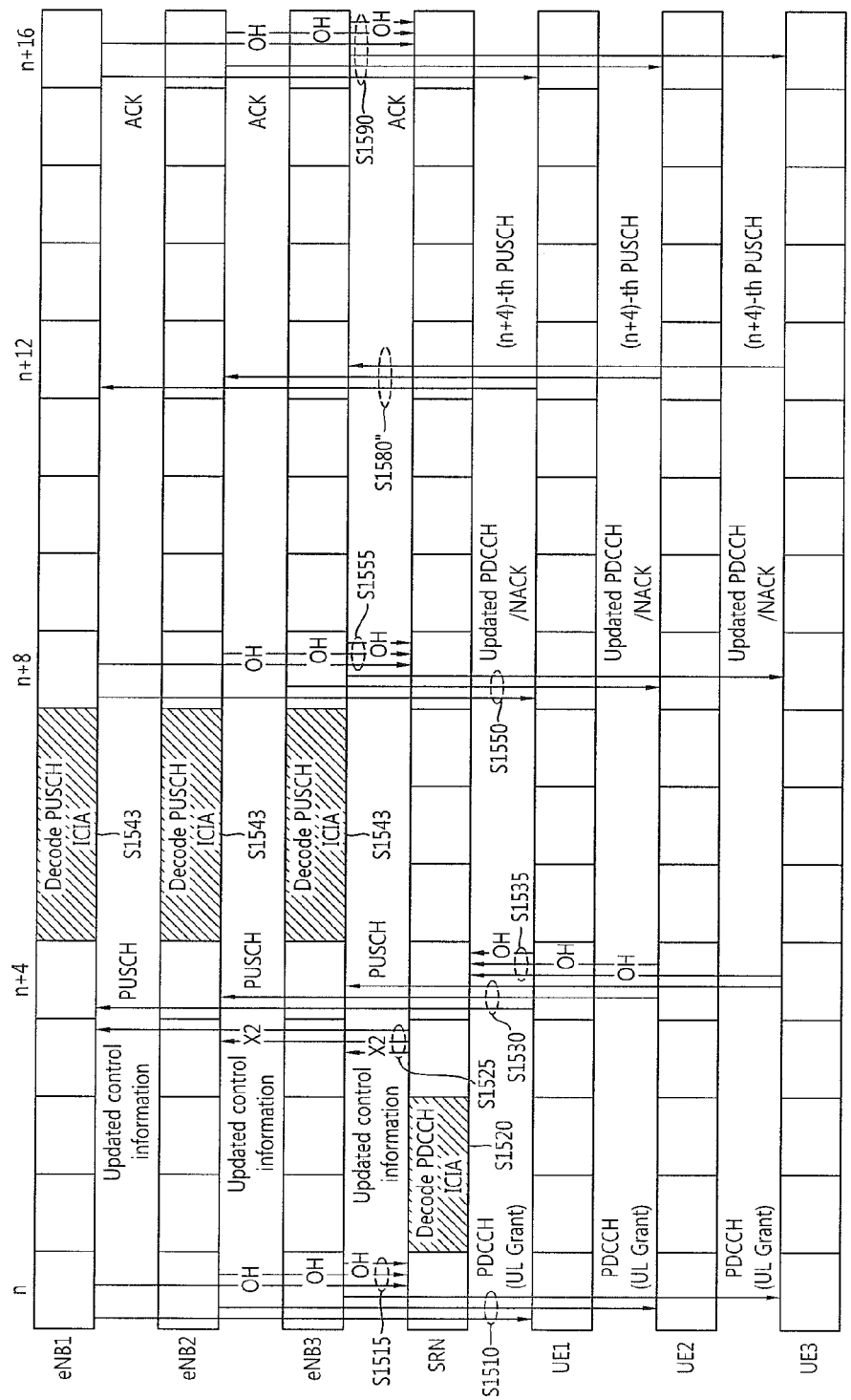

FIGS. 15(a) to 15(c) are diagrams showing the HARQ timing process of an SRN in accordance with yet another embodiment of this specification.

FIGS. 15a to 15c shows a method in which an SRN retransmits a signal cooperatively or non-cooperatively with UE by performing the ICI avoidance process when ICI is generated in all UEs for each eNB in a cell boundary area, that is, when ICI is generated because eNB1-UE1, eNB2-UE2, and eNB3-UE3 use the same resources.

FIG. 15a shows an HARQ timing process in which an SRN and an eNB together perform an ICI avoidance process and retransmit an uplink signal cooperatively with UE.

Referring to FIG. 15a, each of the eNBs eNB1, eNB2, and eNB3 sends a PDCCH to UEs in the coverage of the eNB in an $n^{th}$ subframe (S1510). That is, the eNB1 transmits the PDCCH to UE1, the eNB2 transmits the PDCCH to UE2, and the eNB3 transmits the PDCCH to UE3. Here, the PDCCH includes an UL grant. Here, each eNB forms one cluster.

An SRN overhears the PDCCHs transmitted from the eNBs to the UEs in the $n^{th}$ subframe (S1515).

Next, in an $(n+1)^{th}$ subframe to an $(n+2)^{th}$ subframe, the SRN decodes the PDCCHs and performs an operation for ICI avoidance (S1520).

The operation is indicated by "ICIA" in the figures and is driven as described with reference to FIGS. 8 to 12. If a collision has occurred between resource regions as a result of the decoding of the PDCCHs, the SRN can adopt the method of transferring information for preventing a collision between the resource regions to the eNB (i.e., the second embodiment) or the method of partially processing resource allocation information and transferring the processed information to each eNB (i.e., the third embodiment).

Next, in an $(n+3)^{th}$ subframe, the SRN sends a PDCCH, updated by performing the ICI avoidance process, to each eNB (S1525). Here, X2 signaling can be used. The SRN transfers the information for preventing a collision between resource regions allocated to the UE to the eNB so that a method of reallocating collided resources is provided or a method in which the SRN partially processes resource allocation avoidance information and transfers the processed information to each eNB and each eNB reallocates resources in order to prevent ICI is provided. That is, the SRN transmits information for the operation of the second embodiment or the third embodiment to each eNB.

Next, in an $(n+4)^{th}$ subframe, each UE sends a PUSCH signal to a corresponding eNB (S1530). Here, the SRN overhears the PUSCH signals transmitted by all UEs (S1535). Next, the SRN decodes the overheard PUSCHs in an $(n+5)^{th}$ subframe to an $(n+6)^{th}$ subframe (S1540). Here, the SRN can store the decoded information (i.e., the PUSCHs).

Meanwhile, in an $(n+5)^{th}$ subframe to an $(n+6)^{th}$ subframe, each eNB reallocates a resource region by performing an ICI avoidance process and updates a PDCCH (S1543). Furthermore, each eNB decodes the PUSCH transmitted by corresponding UE.

Next, the SRN sends ACK or NACK indicative of the success or failure of the decoding to a corresponding eNB from an $(n+7)^{th}$ subframe (S1545).

Next, in an $(n+8)^{th}$ subframe, each eNB sends a response to the updated PDCCH and the received PUSCH, received from the SRN, to each UE (S1550). The response is ACK or NACK. If the SRN and the UEs are in a cooperative transmission mode, each eNB sends a NACK signal to the UEs. The SRN overhears the signal transmitted by each eNB in the $(n+8)^{th}$ subframe (S1555).

Next, in an $(n+12)^{th}$ subframe, the UEs and the SRN cooperatively retransmit the PUSCH signal in the $(n+4)^{th}$ subframe (S1580). If the retransmitted PUSCH is normally received, each eNB sends ACK in an $(n+16)^{th}$ subframe (S1590).

FIG. 15b shows another example of an HARQ timing process in which an SRN and an eNB together perform an ICI avoidance process and retransmit an uplink signal cooperatively with UE.

Processes from S1510 to S1590 are the same as those of FIG. 15a. However, a difference is as follows. An SRN decodes overheard PUSCHs in an $(n+5)^{th}$ subframe to an $(n+7)^{th}$ subframe (S1540'). Furthermore, the SRN overhears a signal transmitted by each eNB in an $(n+8)^{th}$ subframe (S1555) and sends a success or failure thereof to each eNB (S1560).

FIG. 15c shows an HARQ timing process in which an SRN and an eNB together perform an ICI avoidance process and retransmit an uplink signal non-cooperatively.

Processes from S1510 to S1590 are the same as those of FIG. 15a. However, in the case of FIG. 15a, the UE and the SRN together retransmit the PUSCH of the $(n+4)^{th}$ subframe in the $(n+12)^{th}$ subframe, but in the case of FIG. 15c, only the UE retransmits the PUSCH of the $(n+4)^{th}$ subframe (S1580").

Here, the SRN does not decode the overheard PUSCH in the $(n+4)^{th}$ subframe, and a reason thereof has been described with reference to FIG. 13d.

Figure 16A:
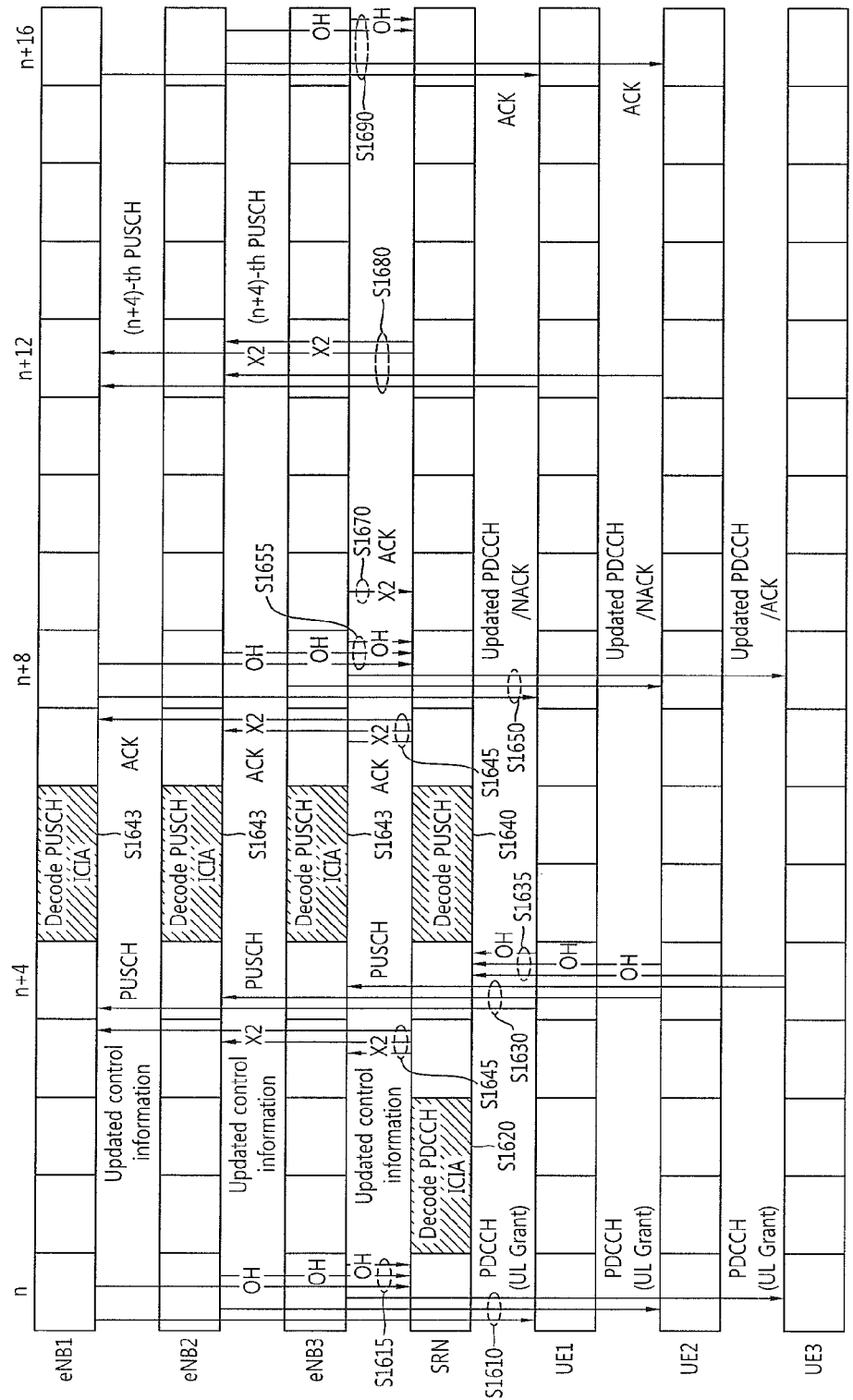
FIGS. 16(a) and 16(b) are diagrams showing the HARQ timing process of an SRN in accordance with yet another embodiment of this specification.
Figure 16B:
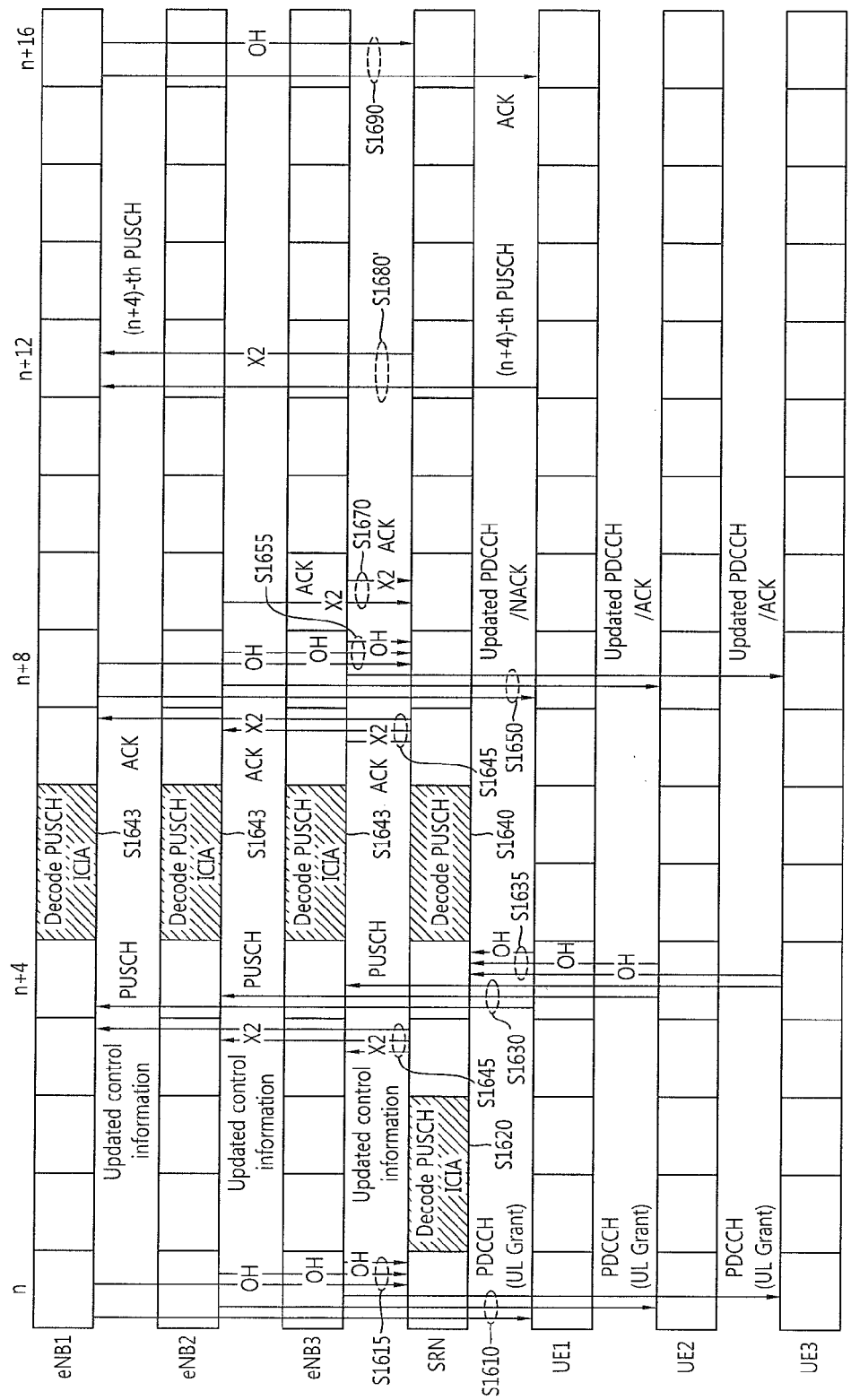

FIGS. 16(a) and 16(b) are diagrams showing the HARQ timing process of an SRN in accordance with yet another embodiment of this specification.

FIG. 16a shows an HARQ timing process in which an SRN and an eNB together perform an ICI avoidance process and retransmit an uplink signal cooperatively with UE.

FIG. 16a shows a method in which an SRN sends a signal cooperatively with an eNB by performing the ICI avoidance process when ICI is generated between two eNB-UE links in a cell boundary area, that is, when ICI is generated because eNB1-UE1 and eNB2-UE2 use the same resources.

Processes from S1610 to S1645 are performed like the processes from S1510 to S1545 of FIG. 15a. If an eNB3 normally receives a PUSCH and sends ACK (S1650), however, an SRN does not retransmit a PUSCH to the eNB3 in an $(n+12)^{th}$ subframe (S1680). Here, for the reason described with reference to FIG. 14a, the eNB3 sends the ACK signal to the SRN (S1670).

FIG. 16b shows an HARQ timing process in which an SRN and an eNB together perform an ICI avoidance process and retransmit an uplink signal cooperatively with UE.

FIG. 16b shows a method in which an SRN sends a signal cooperatively with an eNB by performing the ICI avoidance process when ICI is generated in one link between the eNB and UE in a cell boundary area, that is, when one NACK signal is generated because only an eNB1 does not normally receive a signal.

Processes from S1610 to S1645 are the same as those from S1610 to S1645 of FIG. 16a.

In the case of FIG. 16b, however, unlike in the process of FIG. 16a, a PUSCH is transmitted to only an eNB1 because only the eNB1 has sent NACK in the process of S1650 (S1680').

In this case, as in the case of FIG. 16a, since an eNB2 and an eNB3 take a case where PUSCHs have been normally received into consideration, the eNB2 and the eNB3 send ACK signals, informing that the decoding of the PUSCHs has been normally performed, to an SRN through X2 signaling in an $(n+9)^{th}$ subframe (S1670). Accordingly, the SRN does not attempt retransmission to the eNB2 and the eNB3 in an $(n+12)^{th}$ subframe. In the $(n+12)^{th}$ subframe, the SRN retransmits a PUSCH to only an eNB1 cooperatively with UE.

The aforementioned embodiments are the results of the elements and characteristics of the present invention are combined in a specific form. Each of the elements or characteristics needs to be considered to be optional unless described otherwise explicitly. Each of the elements or characteristics may be implemented in such a way as not to be combined with other elements or characteristics. Furthermore, some of the elements and/or the characteristics may be combined to form an embodiment of the present invention. Order of the operations described in the embodiments of the present invention may be changed. Some of the elements or characteristics of one embodiment may be included in the other embodiment or may be replaced with corresponding elements or characteristics of the other embodiment. It is evident that in the claims, one or more embodiments may be constructed by combining claims not having an explicit citation relation or may be included as one or more new claims by amendments after filing an application.

It is evident to those skilled in the art that the present invention may be materialized in other specific forms without departing from the spirit and essential characteristics of the present invention. Accordingly, the detailed description should not be construed as being limited from all aspects, but should be considered to be being illustrative. The scope of the present invention should be determined by reasonable analysis of the attached claims, and all changes within the equivalent range of the present invention are included in the scope of the present invention.

The invention claimed is:

1. A method for avoiding Inter-Cell Interference (ICI) in a wireless access system, the method comprising:
   overhearing, by a Relay Node (RN) in an $n^{th}$ subframe, physical downlink control channels (PDCCHs) transmitted from a plurality of evolved Node Bs (eNBs), sharing the RN, to user equipments (UEs) within a coverage of each eNB, wherein each of the PDCCHs comprises an uplink (UL) grant;
   decoding, by the RN in an $(n+1)^{th}$ subframe to an $(n+2)^{th}$ subframe, the PDCCHs;

reallocating, by the RN, resource regions allocated to the UEs for the PDCCHs if, as a result of the decoding, a collision has occurred between the resource regions;

sending, by the RN, control information indicative of the reallocated resource region to each of the eNBs;

overhearing, by the RN in an $(n+4)^{th}$ subframe, physical uplink shared channels (PUSCHs) transmitted from the UEs to the eNBs;

decoding, by the RN, the PUSCHs;

sending by the RN, a result of the decoding to each of the eNBs;

overhearing, by the RN in an $(n+8)^{th}$ subframe, an updated PDCCH by taking a response to the PUSCHs transmitted by the eNBs and the reallocated resource regions into consideration, wherein the response to the PUSCHs transmitted by the eNBs is an acknowledgement (ACK) or a negative acknowledgement (NACK);

sending, by the RN, to each of the eNBs, information indicating whether the updated PDCCH has been successfully overheard; and retransmitting, by the RN in an $(n+12)^{th}$ subframe, the PUSCH, transmitted in the (n+4)th subframe, to an eNB that has sent a NACK based on the updated PDCCH.

2. The method of claim 1, wherein the step of reallocating the resource regions further comprises:

comparing the resource regions, allocated to the UEs within a coverage of the RN through a downlink signal, with each other and checking whether or not a resource region in which a collision is generated is present; and performing a resource reallocation process on the resource region in which the collision is generated if, as a result of the check, a resource region in which a collision is generated is present.

3. The method of claim 2, wherein the step of performing the resource reallocation process further comprises:

exchanging the resource region in which the collision is generated with resource regions allocated to UEs outside the coverage of the RN.

4. The method of claim 3, wherein the step of exchanging the resource regions further comprises:

comparing a Signal-to-Interference plus Noise Ratio (SINR) value of the resource region in which the collision is generated with an SINR value of each of the resource regions allocated to the UEs outside the coverage of the RN; and determining a resource region, having a smallest SINR value difference as a result of the comparison, as the resource region to be exchanged.

5. The method of claim 1, wherein:

the plurality of eNBs comprises three eNBs, and the RN is a Shared Relay Node (SRN) shared by the three eNBs.

6. The method of claim 1, further comprising:

sending an indication of whether or not the decoding of the PUSCHs is successful to each of the eNBs after the step of decoding the PUSCHs.

7. The method of claim 1, wherein the RN uses X2 signaling with the plurality of eNBs.

8. The method of claim 1, wherein the response to the PUSCHs transmitted by the eNBs in the (n+8)th subframe is a NACK when the RN operates in a cooperative mode and is ACK when the RN operates in a non-cooperative mode.

9. A method for avoiding Inter-Cell Interference (ICI) in a wireless access system, the method comprising:

sending, by an evolved Node B (eNB) in an $n^{th}$ subframe, a physical downlink control channel (PDCCH) to a user equipment (UE) within a coverage of the eNB, wherein the PDCCH comprises an unlink (UL) grant;

receiving, by the eNB in an $(n+3)^{th}$ subframe, control information, indicating that a resource reallocation process for the PDCCH is necessary, from a Relay Node (RN);

receiving, by the eNB in an $(n+4)^{th}$ subframe, a physical uplink shared channel (PUSCH) from the UE;

decoding, by the eNB, the received PUSCH;

reallocating, by the eNB, a resource region allocated to the UE for the PDCCH based on the control information received from the RN;

sending, by the eNB in an $(n+8)^{th}$ subframe, an updated PDCCH to the UE by taking a response to a result of the decoding of the PUSCH and the resource region reallocation into consideration, wherein the response is an acknowledgement (ACK) or a negative acknowledgement (NACK);

receiving, by the eNB, information indicating whether the updated PDCCH has been successfully overheard from the RN after sending the updated PDCCH to the UE; and receiving, by the eNB in an $(n+12)^{th}$ subframe, the PUSCH, transmitted in the $(n+4)^{th}$ subframe again in response to the updated PDCCH if a NACK has been transmitted.

10. The method of claim 9, wherein the step of reallocating the resource region comprises:

comparing resource regions, allocated to UEs within a coverage of the RN through a downlink signal, with each other and checking whether or not a resource region in which a collision is generated is present; and performing a resource reallocation process on the resource region in which the collision is generated if, as a result of the check, a resource region in which a collision is generated is present.

11. The method of claim 10, wherein the step of performing the resource reallocation process further comprises:

exchanging the resource region in which the collision is generated with resource regions allocated to UEs outside the coverage of the RN.

12. The method of claim 11, wherein the step of exchanging the resource regions further comprises:

comparing a Signal-to-Interference plus Noise Ratio (SINR) value of the resource region in which the collision is generated with an SINR value of each of the resource regions allocated to the UEs outside the coverage of the RN; and determining a resource region, having a smallest SINR value difference as a result of the comparison, as the resource region to be exchanged.

13. The method of claim 9, wherein the RN is a Shared Relay Node (SRN) shared by a plurality of eNBs.

14. The method of claim 9, further comprising:

receiving an indication of whether or not the decoding of the PUSCH is successful from the RN, after decoding the received PUSCH.

* * * * *